(12) United States Patent
Fong et al.

(10) Patent No.: US 11,330,438 B2
(45) Date of Patent: *May 10, 2022

(54) ACTIVE BASE PROVIDING LOCAL MAN-IN-THE-MIDDLE FIREWALL

(71) Applicant: PPIP LLC, Tempe, AZ (US)

(72) Inventors: Michael Fong, Tempe, AZ (US); Neric Hsin-Wu Fong, Tempe, AZ (US)

(73) Assignee: PPIP, LLC, Chandler, AZ (US)

(*) Notice: Subject to any disclaimer, the term of this patent is extended or adjusted under 35 U.S.C. 154(b) by 311 days.

This patent is subject to a terminal disclaimer.

(21) Appl. No.: 16/409,640

(22) Filed: May 10, 2019

(65) Prior Publication Data

US 2019/0349772 A1 Nov. 14, 2019

Related U.S. Application Data

(60) Provisional application No. 62/671,323, filed on May 14, 2018.

(51) Int. Cl.
| | | |
|---|---|---|
| *H04W 12/30* | (2021.01) | |
| *H04W 12/088* | (2021.01) | |
| *H04W 12/40* | (2021.01) | |
| *H04W 12/122* | (2021.01) | |

(52) U.S. Cl.
CPC ....... *H04W 12/088* (2021.01); *H04W 12/122* (2021.01); *H04W 12/35* (2021.01); *H04W 12/40* (2021.01)

(58) Field of Classification Search
CPC . H04W 12/088; H04W 12/122; H04W 12/35; H04W 12/069; G06F 1/1632; G06F 21/57; G06F 21/64; G06F 21/56; G06F 21/566; G06F 21/567; H04L 63/0823
See application file for complete search history.

(56) References Cited

U.S. PATENT DOCUMENTS

| | | | | |
|---|---|---|---|---|
| 10,778,274 | B1* | 9/2020 | Paraskevaidis | ...... H04B 1/3888 |
| 2006/0237529 | A1* | 10/2006 | Kelley | .................. G07F 7/1008 |
| | | | | 235/380 |
| 2009/0023475 | A1* | 1/2009 | Chang | ............... H04M 1/72409 |
| | | | | 455/557 |
| 2009/0161303 | A1* | 6/2009 | Hirota | ................... G06F 1/1632 |
| | | | | 361/679.01 |

(Continued)

*Primary Examiner* — Lizbeth Torres-Diaz
(74) *Attorney, Agent, or Firm* — Fernando & Partners, LLP

(57) ABSTRACT

In accordance with some embodiments, an apparatus for privacy protection includes a housing arranged to hold a personal communication device. The apparatus further includes a remote communication device and a local communication device at least partially supported by the housing, where the remote communication device is operable to provide a remote communication channel between the apparatus and a remote device and the local communication device is operable to provide a local communication channel to the personal communication device. The apparatus additionally includes a security management controller operable to: (a) extract data from communication messages received via the remote communication channel; (b) scan the extracted data in order to identify a first type of extracted data; and (c) send the first type of extracted data to the personal communication device through the local communication channel.

20 Claims, 15 Drawing Sheets

(56) References Cited

U.S. PATENT DOCUMENTS

| | | | | |
|---|---|---|---|---|
| 2012/0087078 A1* | 4/2012 | Medica | ............... | H02J 7/342 |
| | | | | 361/679.31 |
| 2013/0039491 A1* | 2/2013 | Unagami | ............ | G06F 21/64 |
| | | | | 380/44 |
| 2014/0173692 A1* | 6/2014 | Srinivasan | ......... | H04W 12/02 |
| | | | | 726/4 |
| 2016/0084707 A1* | 3/2016 | Scott | ................. | G01J 3/0291 |
| | | | | 356/326 |
| 2016/0187877 A1* | 6/2016 | Diperna | ............ | B25J 9/1679 |
| | | | | 702/108 |
| 2018/0316443 A1* | 11/2018 | Diperna | ............... | H04N 7/18 |
| 2019/0228374 A1* | 7/2019 | Hicks | .............. | G06K 7/10881 |
| 2019/0245829 A1* | 8/2019 | Touboul | ........... | H04W 12/128 |
| 2019/0349768 A1* | 11/2019 | Fong | .................. | H04W 4/38 |
| 2019/0349772 A1* | 11/2019 | Fong | .................. | H04W 12/03 |
| 2019/0354139 A1* | 11/2019 | Fong | .................. | G06F 1/189 |
| 2020/0210624 A1* | 7/2020 | Ladikov | ........... | G06F 21/565 |
| 2020/0218809 A1* | 7/2020 | Lam | ................... | G06F 21/554 |
| 2020/0236526 A1* | 7/2020 | Fong | .................. | G06F 1/1632 |
| 2021/0091954 A1* | 3/2021 | Brown | ............... | H04L 9/3215 |

* cited by examiner

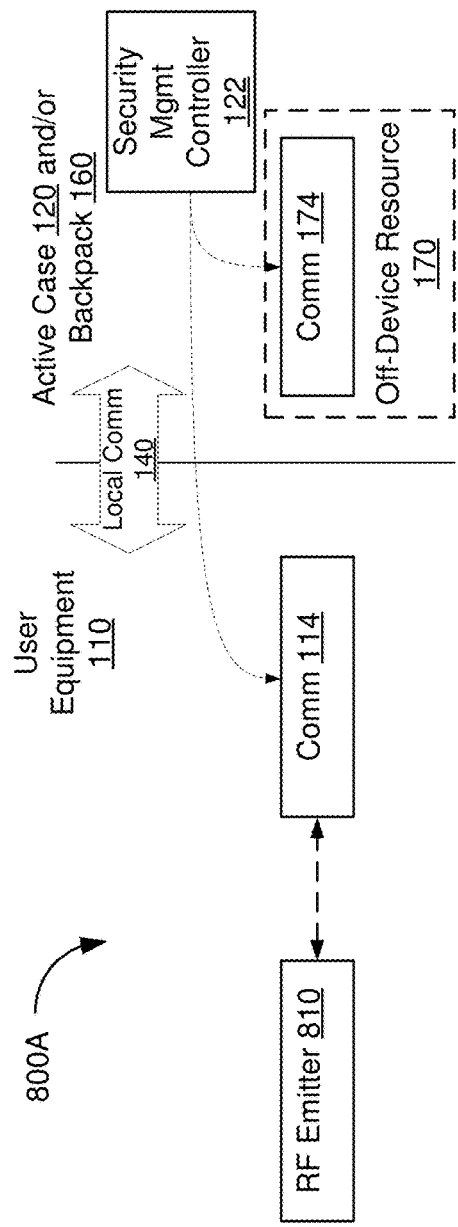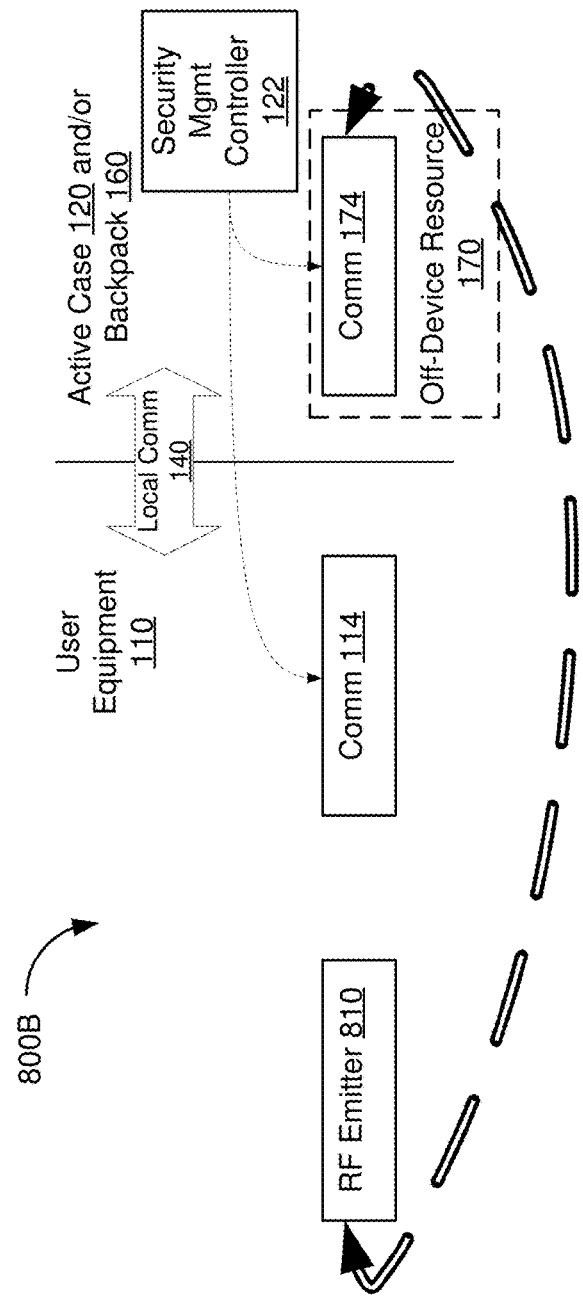

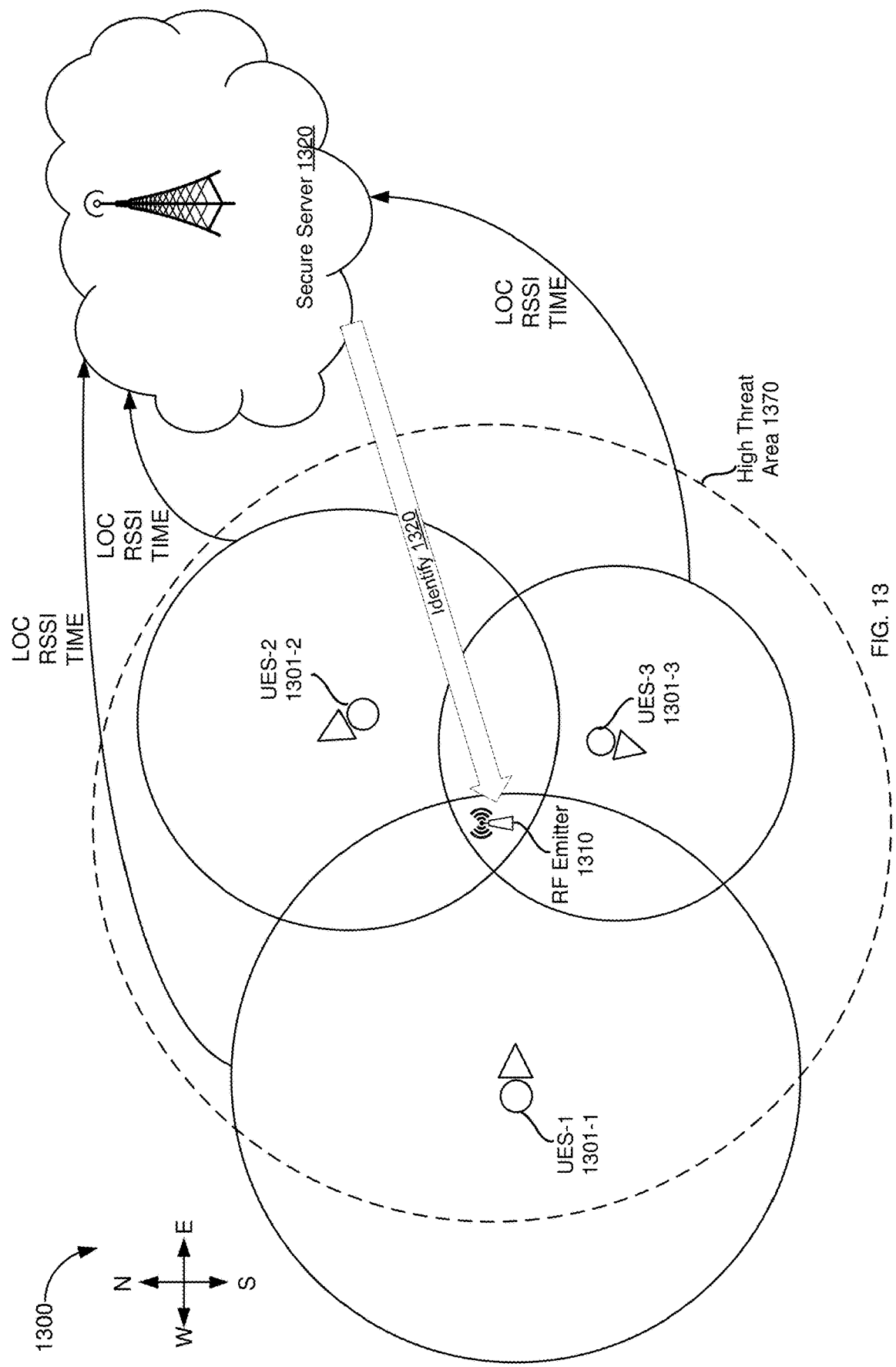

ACTIVE BASE PROVIDING LOCAL MAN-IN-THE-MIDDLE FIREWALL

PRIORITY CLAIM

This application claims priority to U.S. provisional patent application No. 62/671,323 filed on May 14, 2018, the contents of which are hereby incorporated by reference.

TECHNICAL FIELD

This relates generally to the field of privacy protection, and more specifically to an apparatus that provides local man-in-the-middle firewall for privacy protection of electronic devices.

BACKGROUND

Smartphones are central to daily life. However, when third-parties (e.g., hackers) gain access to a smartphone (e.g., hijack), a user may not even notice the privacy intrusion. In particular, when the smartphone is connected to a radio frequency (RF) emitter for wireless access, e.g., a rogue base station or a fake WiFi access point that collects private information or plants malicious codes on the smartphone, conventional network security technics (e.g., firewall and/or virtual private network (VPN)) are inadequate. As such, the user would not know that the RF emitter in the middle of the communication path has misappropriated private information for malicious purposes.

BRIEF DESCRIPTION OF THE DRAWINGS

So that the present disclosure can be understood by those of ordinary skill in the art, a more detailed description can be had by reference to aspects of some illustrative embodiments, some of which are shown in the accompanying drawings.

FIGS. 8A and 8B illustrate an exemplary local off-device resource providing alternative data transport in accordance with some embodiments;

FIG. 13 illustrates an exemplary multi-user distributed RF sensor network for RF emitter detection and mapping in accordance with some embodiments.

Figure 1:
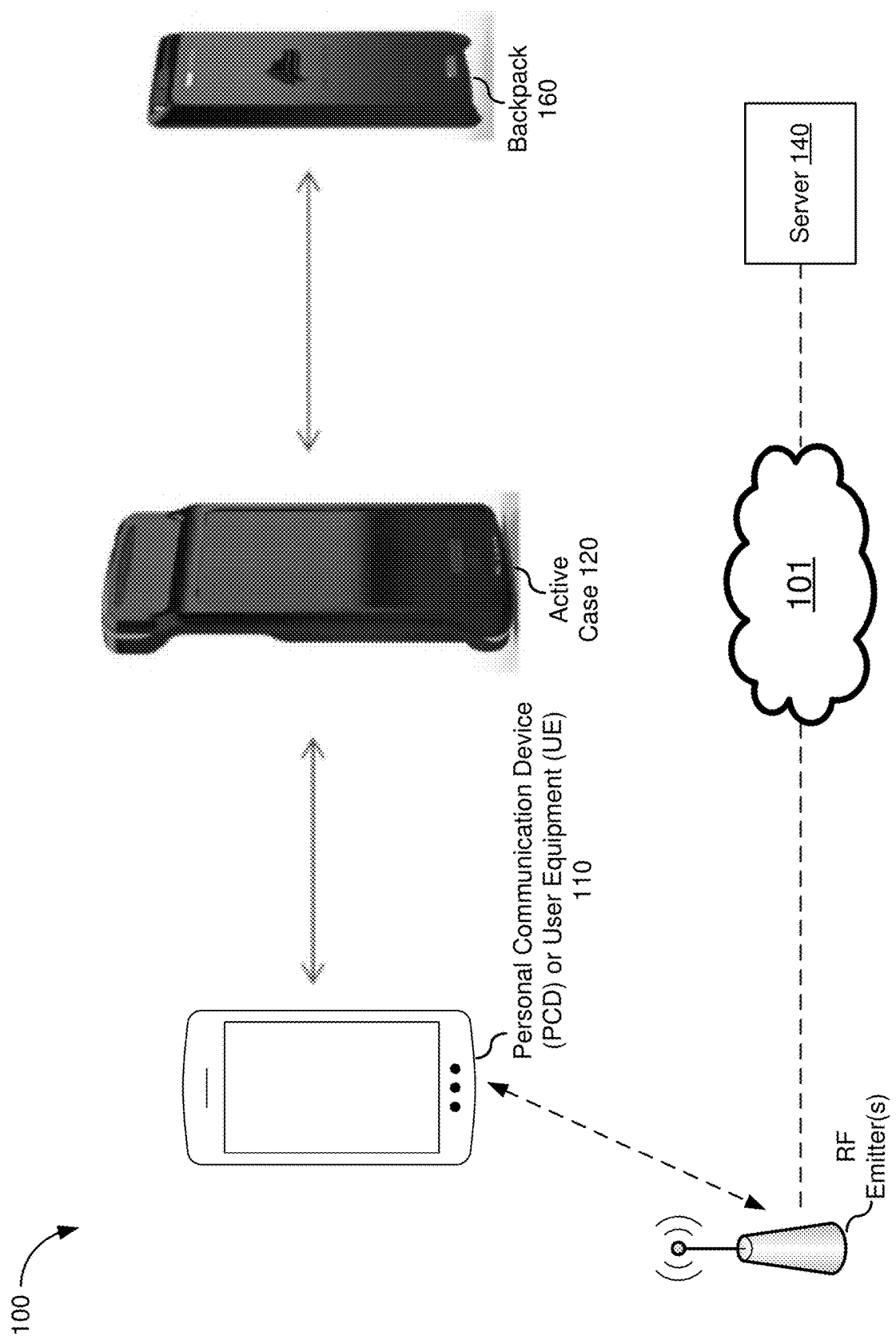
FIG. 1 is a block diagram of an exemplary system with an active base providing local man-in-the-middle firewall in accordance with some embodiments.

In accordance with common practice the various features illustrated in the drawings cannot be drawn to scale. Accordingly, the dimensions of the various features can be arbitrarily expanded or reduced for clarity. In addition, some of the drawings cannot depict all of the components of a given system, method or device. Finally, like reference numerals can be used to denote like features throughout the specification and figures.

DETAILED DESCRIPTION

Accordingly, described herein is an apparatus (e.g., a smart case, a safe case, a secure case, an active base, an active base, or a case) for a personal communication device (e.g., a smartphone, a wearable device, or a tablet etc.) that provides a local man-in-the-middle firewall to actively monitor communication between the personal communication device and any RF emitter(s). In some embodiments, the local man-in-the-middle firewall recognizes rogue RF stations and/or access points. Further, in some embodiments, the local man-in-the-middle firewall serves as a proxy to segregate potentially malicious codes, and prevents such malicious codes from being deployed on the personal communication device. As such, malicious content and/or RF emitters would not be able to compromise the personal communication device and/or exploit resources on the personal communication device.

In some embodiments, the local man-in-the-middle firewall is provided through supplemental resources, such as processing, memory, security, and communication links, etc. In some embodiments, the supplemental resources are provided to the personal communication device as local off-device resources, such that these resources are outside a housing of the personal communication device, but can be used by the personal communication device and provide local communication, storage, and processing function to the personal communication device. The functions provided by the supplemental resources can replace certain functions performed by the personal communication device and/or supplement certain functions performed by the personal communication device. By replacing or supplementing certain functions of the personal communication device, the apparatus disclosed herein in accordance with various embodiments enhances intrusion detection and privacy protection without consuming the computational or power resources of the personal communication device.

In accordance with some embodiments, an apparatus includes a housing arranged to hold a personal communication device. The apparatus further includes a remote communication device (e.g., cellular, WiFi, LoRa, etc.) at least partially supported by the housing, where the remote communication device is operable to provide a remote communication channel between the apparatus and a remote device (e.g., base station, eNodeB, WiFi AP, etc.). The apparatus also includes a local communication device (e.g., WiFi, BT/BLE, infrared, NFC, a Lightning® (a registered trademark of Apple Inc., Cupertino, Calif.) connector, etc.) at least partially supported by the housing, where the local communication device (e.g., a WiFi modem, BT/BLE radio, infrared radio, NFC radio, a Lightning® (a registered trademark of Apple Inc., Cupertino, Calif.) connector, etc.) is operable to provide a local communication channel (e.g., wirelessly or via physical connection) to the personal communication device. The apparatus additionally includes a security management controller coupled to the remote communication device and the local communication device. In some embodiments, the security management controller is operable to: (a) perform data extraction in order to obtain extracted data from communication messages received through the remote communication channel from the remote device; (b) scan the extracted data in order to identify a first type of extracted data (e.g., non-malicious content, encrypted or un-encrypted, etc.), and send the first type of extracted data to the personal communication device via the local communication channel.

In accordance with some embodiments, a device includes one or more processors, non-transitory memory, and one or more programs; the one or more programs are stored in the non-transitory memory and configured to be executed by the one or more processors and the one or more programs include instructions for performing or causing performance of the operations of any of the methods described herein. In accordance with some embodiments, a non-transitory computer readable storage medium has stored therein instructions which when executed by one or more processors of a device, cause the device to perform or cause performance of the operations of any of the methods described herein. In accordance with some embodiments, a device includes means for performing or causing performance of the operations of any of the methods described herein.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact, unless the context clearly indicates otherwise.

The terminology used in the description of the various described embodiments herein is for the purpose of describing particular embodiments only and is not intended to be limiting. As used in the description of the various described embodiments and the appended claims, the singular forms "a", "an", and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes", "including", "comprises", and/or "comprising", when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]", depending on the context.

It should be appreciated that in the development of any actual implementation (as in any development project), numerous decisions must be made to achieve the developers' specific goals (e.g., compliance with system and business-related constraints), and that these goals will vary from one implementation to another. It will also be appreciated that such development efforts might be complex and time consuming, but would nevertheless be a routine undertaking for those of ordinary skill in the art of image capture having the benefit of this disclosure.

Referring to FIG. 1, a simplified block diagram of a system 100 for the protection of a personal communication device 110 in communication with one or more RF emitters 190 is depicted, in accordance with some embodiments. In some embodiments, the system 100 includes the personal communication device 110 (also known as a user equipment (UE) or a user device), an active case 120 (also known as an active base, a safe case, a case, an active case, or a secure case), and an apparatus 160 (also known as a backpack or a supplemental functional device) connectable to a server 140 through a network 101 represented by a cloud. In some embodiments, the one or more RF emitters 190 (e.g., a base station, a WiFi access point, a LoRa chip, etc.) wirelessly connect the personal communication device 110 to the network.

In some embodiments, when paired with the personal communication device 110 via the active case 120, the supplemental functional device 160 is operable to provide supplemental functionalities to the personal communication device 110. For example, the supplemental functional devices can detect RF energy emission, sniff uplink TCP/IP transfer, or detect the presence of chemicals or drugs, etc. The additional information collected by the supplemental functional device 160 can be used by the personal communication device 110 and/or the active case 120 for further intrusion detection and privacy protection. In particular, an RF sniffer on the active case 120 or as the backpack 160 attached to the active case 120 can detect in-range RF emitter(s) 190, work with other RF sniffers through the coordination by the server 140 to geolocate, track and map the in-range RF emitters and use the aggregated data from the RF sniffers and/or with external data sources (e.g., FCC cell tower database, internal or other 3rd party DBs, etc.) to assess the in-range RF emitter(s) 190 and report or take action based on the assessment, e.g., detect a rogue base station and transmit the rogue station information to the cloud for mapping. Further, the supplemental functional device 160 can provide a local man-in-the-middle firewall between the RF emitter 190 and the personal communication device 110, as will be described below in further detail.

Figure 2:
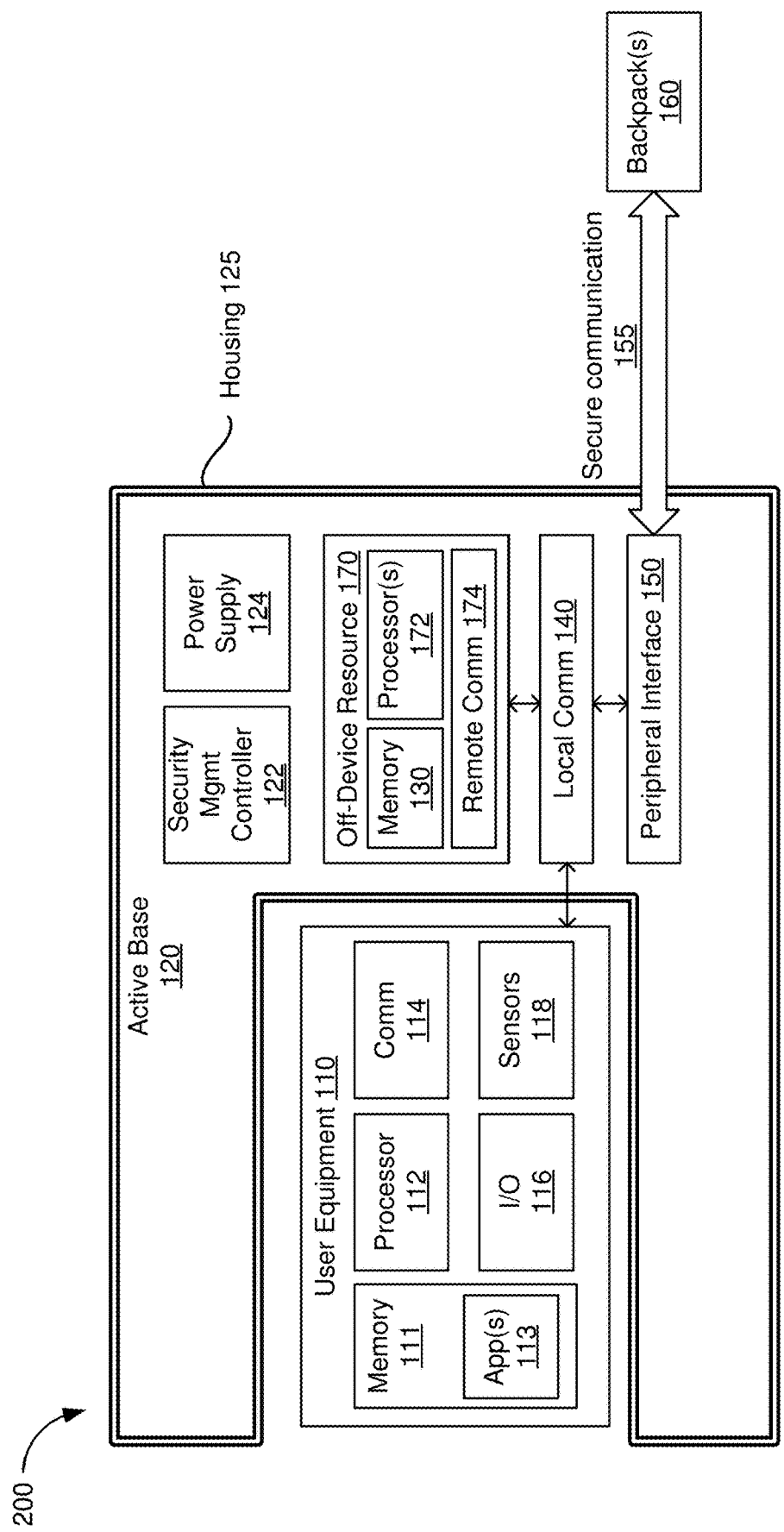
FIG. 2 is a block diagram of an exemplary active base holding a user equipment and connectable to a supplemental functional device in accordance with some embodiments.

Turning to FIG. 2, a simplified block diagram of the active base 120 holding the personal communication device 110 is depicted, in accordance with some embodiments. Different from a conventional base or case that merely provides structural support of another device, the active base 120 actively monitors and analyzes the personal communication device 110 in order to determine whether the personal communication device 110 is a compromised device and takes appropriate actions to protect the personal communication device 110 against potential intrusion. As such, when the personal communication device 110 is held by the active case 120, the active case 120 enhances the security of the personal communication device 110.

In some embodiments, the active case 120 includes a housing 125 arranged to hold the personal communication device 110 (e.g., a smartphone, a wearable, a tablet, etc.). In some embodiments, the housing 125 includes a plurality of components mateable with another. In other words, the plurality of components, once mated with one another, form a housing assembly to hold the personal communication device 110. The housing assembly allows a user to insert the personal communication device 110 into the active case 120 for more protection of work-related sensitive information (e.g., in a work mode) or take the personal communication device 110 out of the active case 120 for less monitoring of the personal communication by enterprise (e.g., in a personal mode).

The active base 120 can have one or more moveable components (e.g., a hood) operable to slide to one or more positions (e.g., up or down) as well as non-moveable components. In such embodiments, the one or more moveable components, when in a first position (e.g., hood pushed down), are mateable (e.g., mechanically and/or electrically) with the non-moving components to form a housing assembly. The housing assembly forms an enclosure that at least partially supports and holds the personal communication device 110, e.g., a partial enclosure as shown in FIG. 2 or a whole enclosure encapsulating the personal communication device 110. When in the first position, the housing 125, along with other components of the active base 120, protects the personal communication device 110 against tracking or spying, e.g., by audio jamming, camera covering, and/or RF shielding, etc. When the one or more moveable components of the housing assembly are in a second position (e.g., hood slid up), a user can take the personal communication device 110 out of the housing 125 and place the personal communication device 110 in a non-protected mode.

In some embodiments, the active base 120 includes a peripheral interface 150 (e.g., a backpack interface) to connect to a supplemental functional device 160 (e.g., a backpack). A supplemental functional device, as described herein, is a device connectable to the user equipment 110 through the active base 120 and provides supplemental functional functions to the user equipment 110. In some embodiments, the supplemental functional device 160 includes a backpack that is a modular and detachable device. The backpack allows additional hardware and software functionality to be provided to a user of the personal communication device 110. In some embodiments, the supplemental functional device 160 is connected to the active base 110 through its peripheral interface connectable to the peripheral interface 150. In some embodiments, the peripheral interface 150 connects the supplemental functional device 160 to the active base 110 and the local communication device 140 further connects the peripheral interface 150 to the user equipment 110.

In some embodiments, the housing 125 at least partially supports the peripheral interface 150. For example, in an exemplary system 300A shown in FIG. 3A, the peripheral interface 150 includes a number of connectors (e.g., contact pins or contact pads as indicated by the dots) connectable to the supplemental functional device 160. In some embodiments, the connectors are affixed to the housing 125 and at least partially supported by the housing 125, as shown in an exemplary system 300B shown in FIG. 3B. The connectors are mateable to the interface of the backpack 160. In some embodiments, as shown in yet another exemplary system 300C in FIG. 3C, the peripheral interface 150 is wholly supported by the housing 125, such that the peripheral interface 150 is integrated with or embedded in the housing 125 surface. In such embodiments, connectors from the backpack 160 can be plugged into the peripheral interface 150 in order to connect the backpack 160 to the active base 120. In the embodiments shown in FIGS. 3B and 3C, the peripheral interface 150 is operable to communicate with the supplemental functional device 160 via a physical channel including communication connectors. The physical channel forms a secure channel for communication between the active base 120 and the backpack 160.

Figure 3A:
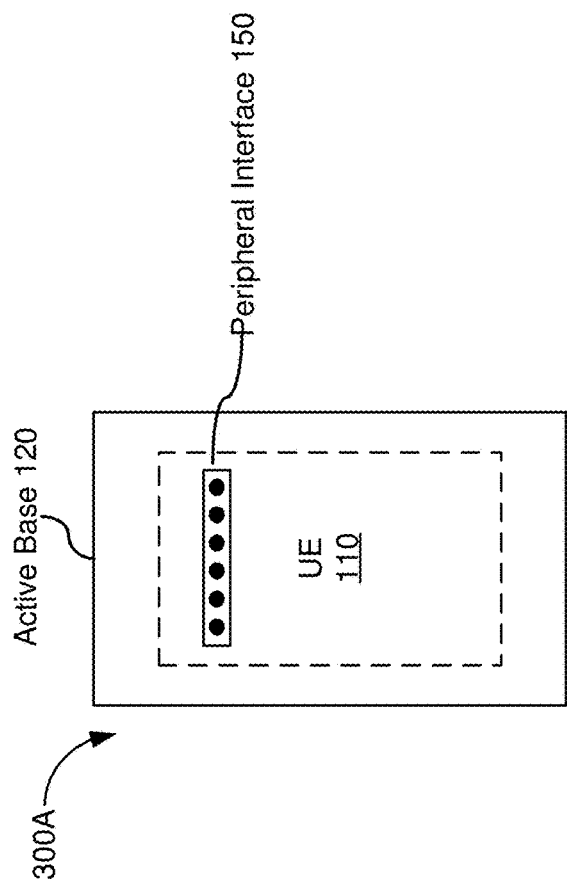
FIGS. 3A-3C are illustrations of exemplary peripheral interfaces connectable to a housing of the apparatus in accordance with some embodiments.
Figure 3C:
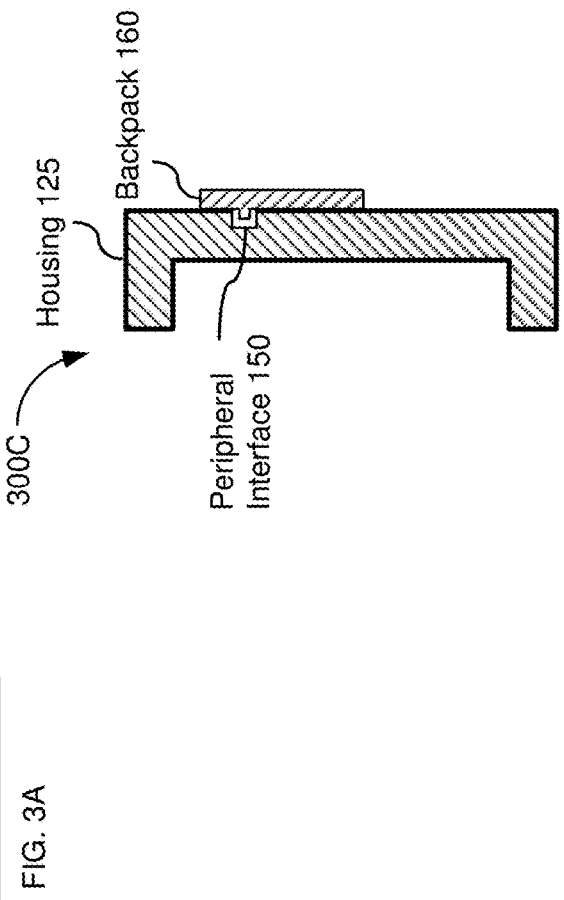
Figure 3B:
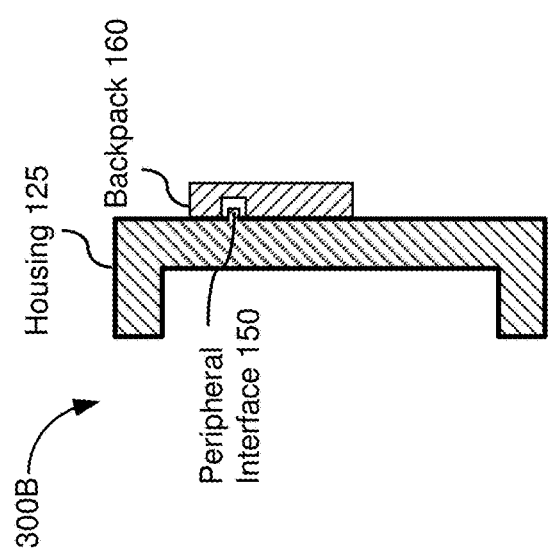

In some embodiments, as shown in FIGS. 3B and 3C, the backpack 160 snaps onto the back of the active case 120 in order to be connected to the active case 120 for added functionality. It should be noted that though FIGS. 3A-3C illustrate the peripheral interface 150 with physical connectors, in some embodiments, the peripheral interface 150 is a wireless interface. In some embodiments, the peripheral interface 150 includes a wireless modem operable to wirelessly communicate with the supplemental functional device 160. In some embodiments, the peripheral interface 150 leverages the wireless communication capability of the local communication device 140 to communicate with the supplemental functional device 160. For example, the active base 120 can connect to a wireless communication enabled backpack device 160 through a wireless peripheral interface 150 or through a wireless modem of the local communication device 140. As such, a wireless communication-enabled backpack 160 can communicate with the active base 120 without being in contact with the housing 125 or physically connected to the peripheral interface 150. Further, it should be noted that at least some components of the backpack 160 can be integrated into the active case 120 or vice versa. As such, in some embodiments, at least some supplemental functions provided by the backpack 160 can also be provided by the active case 120; and in some embodiments, some off-device resources are provided by the backpack 160.

Referring back to FIG. 2, in some embodiments, the active base 120 includes a local communication device 140 coupled to the peripheral interface 150 and supported by the housing 125. In some embodiments, the local communication device 140 includes a personal communication device interface modem (e.g., a WiFi modem, a BT/BLE radio, an infrared radio, an NFC radio, a Lightning® (a registered trademark of Apple Inc., Cupertino, Calif.) connector, etc.) operable to provide a communication channel (e.g., wirelessly or via physical connection) between the peripheral interface 150 and the personal communication device 110. In one direction, the communication channel carries information from the personal communication device 110 to the active base 120 for validation. In the other direction, the communication channel (e.g., a secure communication channel 155) carries information from the supplemental functional device 160 via the peripheral interface 150 to the personal communication device 110 in order to supplement the functionality of the personal communication device 110.

In some embodiments, the active base 120 includes at least one off-device resource 170 supported by the housing 125. The at least one off-device resource 170 provides an alternate (e.g., replacing or supplementing) to a corresponding on-device resource integrated within the personal communication device 110. For example, the at least one off-device resource 170 can include one or more processors 172, non-transitory memory 130, and/or at least one remote communication device 174 (e.g., cellular, GPS, WiFi, LoRa, etc.). These off-device resources 170 can replace or supplement the processor 112, the memory 111, and/or the communication device(s) 114 of the user equipment 110. In some embodiments, the remote communication device 174 (e.g., cellular, WiFi, LoRa, etc.) is at least partially supported by the housing 125, and the remote communication device 174 is operable to provide a remote communication channel between the active base 120 and a remote device (e.g., base station, eNodeB, WiFi AP, etc.).

In some embodiments, the at least one off-device 170 is coupled to the local communication device 140 (e.g., WiFi, BT/BLE, infrared, NFC, a Lightning® (a registered trademark of Apple Inc., Cupertino, Calif.) connector, etc.). In some embodiments, the local communication device 140 includes a personal communication device interface modem (e.g., a WiFi modem, BT/BLE radio, infrared radio, NFC radio, a Lightning® (a registered trademark of Apple Inc., Cupertino, Calif.) connector, etc.) operable to provide a communication channel (e.g., wirelessly or via physical connection) between the at least one off-device resource 140 and the personal communication device 110.

In some embodiments, the active base 120 includes a security management controller 122 coupled to the peripheral interface 150, the at least one off-device resource 170, and/or the local communication device 140. Embodiments of the security management controller 122 include hardware, software, firmware, or a combination thereof. In some embodiments, the security management controller is operable to perform data extraction in order to obtain extracted data from communication messages received through the remote communication channel from the remote device, scan the extracted data in order to identify a first type of extracted data (e.g., non-malicious content, encrypted or un-encrypted, etc.), and send the first type of extracted data to the personal communication device 110 via the local communication channel.

In some embodiments, the security management controller 122 is also operable to manage the communication channel between the personal communication device 110 and the backpack 160 and through the local communication device 140 and the peripheral interface 150. In other words, the security management controller 122 manages a segment of the communication channel between the personal communication device 110 and the active case 120 through the management of the local communication device 140, and the security management controller 122 manages a segment of the communication channel between the active case 120 and the backpack 160 through the management of the peripheral interface 150. Further, in some embodiments, the security management controller 122 is operable to manage the resource scheduling and communication between the at least one off-device resource 170 and the corresponding on-device resource through the communication channel provided by the local communication device 140.

In addition to managing the communication channel, the security management controller 122 logs data in a secure area of the active base 120. Logging data in the secure area of the active base 120 has the advantage of providing trustworthy status report of the user equipment 110 for analysis in case the user equipment 110 has been or potentially has been compromised. For example, many high-value enterprises invest significantly to implement tight monitoring and access control within their own networks, but lose visibility and control to external networks such as the cellular networks or WiFi hotspots. Once a smartphone is compromised, the status report from the phone operating system may not be trustworthy. By logging data in a secure area of the apparatus, reliable status reports can be generated for Enterprise Mobility Management (EMM), and EMM can then rely on the reliable information to limit the threat spread.

As is known in the art, there are several types of firewalls. One type is network-based firewall that acts as a filter blocking illegitimate traffic from reaching and harming a private network. Since network-based firewall acts at the perimeter of the private network, conventional network-based firewall is often ineffective in protecting illegitimate network activities within the same private network, e.g., between hosts. While network-based firewall filters traffic going from the Internet to the private network and vice versa, another type of firewall, host-based firewall (also known as a local firewall) is a software application installed on a single host and provides protection specific to the host. Relative to network-based firewall, host-based firewall provides a limited defense barrier to network activities. Further, running the software application on the host consumes computational and power resources. As such, conventional host-based firewalls are often burdensome for end users.

In contrast, the active case 120 and/or the backpack 160 (collectively known as user equipment sniffer (UES)) provides a local man-in-the-middle (MITM) firewall that runs on the UES (e.g., by the security management controller 122, the off-device resource 170, and/or the backpack 160) but is in close proximity to the personal communication device 110 (e.g., within the range of millimeters). Because the local MITM firewall runs on a separate apparatus, relative to the conventional host-based firewall, the local MITM firewall disclosed herein consumes less of the computational and/or power resources of the personal communication device 110. Further, as will be described below, because the UES is in close distance to the personal communication device 110, the UES is capable of analyzing packets transmitted from and/or received by the personal communication device 110. As such, the UES is capable of filtering and blocking illegitimate traffic and allowing legitimate traffic. Thus, the UES described herein in accordance with various embodiments is advantageous to conventional host-based firewall and network-based firewall.

In some embodiments, the active base 120 includes a power supply 124. The power supply 124 supplies power to the peripheral interface 150, the local communication device 140, and the security management controller 122. In some embodiments, the power supply 124 includes at least one of a battery, a charging socket, a USB connector, a power plug, and/or a power socket. In some embodiments, the power supply 124 includes a connector for a battery.

In some embodiments, the personal communication device 110 held by the active base 120 includes a processor 112, one or more communication devices 114, an input/output interface 116, sensors 118, memory 111, and applications 113, which further includes instructions stored in the memory 111 and executed by the processor 112. In some embodiments, the personal communication device 110 is a portable communications device, such as a mobile phone, a wearable device, a tablet, a laptop computer, a digital media player, an electronic reader, or the like. In some embodiments, the personal communication device is a non-portable device, such as a desktop computer, a data storage device, a smart TV, a video game console, a smart home appliance or the like that is capable of storing, transmitting, and receiving data. It will be appreciated that the components, devices or elements illustrated in and described with respect to FIG. 1 below may not be mandatory and thus some may be omitted in certain embodiments. Additionally, some embodiments can include further or different components, devices or elements beyond those illustrated in and described with respect to FIG. 1.

In some embodiments, the processor 112 is coupled to the communication devices 114 in order to control the communication using the communication device 114, in accordance with some embodiments. In addition to controlling communication, the processor 112 processes data and executes applications 113, in accordance with some embodiments. In some embodiments, the processor 112 includes one or more chips chipsets embodied in a variety of forms. For example, the processor 112 can be embodied as various hardware-based processing means such as a microprocessor, a coprocessor, a controller, or other computing devices including integrated circuits, such as an ASIC (application specific integrated circuit), an FPGA (field programmable gate array), some combination thereof, or the like. Although illustrated as a single processor, it will be appreciated that the processor 112 can comprise a plurality of processors. The plurality of processors communicates with each other and collectively perform one or more functionalities. In some embodiments, the processor 112 can be configured to execute instructions that can be stored in the memory 111 or that can be otherwise accessible to the processor 112. As such, whether configured by hardware or by a combination of hardware, firmware, and software, the processor 112 is capable of performing operations according to various embodiments.

In some embodiments, the memory 111 includes one or more memory devices, including fixed and/or removable memory devices. In some embodiments, the memory 111 provides a non-transitory computer-readable storage medium for storing computer program instructions (e.g., the application(s) 113) to be executed by the processor 112. In some embodiments, the memory 111 exchanges information with one or more of the processor 112, the input/output interface 116, the communication devices 114, or the sensors 118 via a bus. In some embodiments, the applications 113 stored in the memory 111 include an application for exchanging information between the user equipment 110 and an external electronic device (e.g., the active base 120). The information exchange includes, for example, transmitting information obtained by the communication device 114 and/or sensors 118 to an external electronic device (e.g., the active base 120) or receiving information from the external electronic device, e.g., the information gathered by the supplemental functional devices 160 and relayed by the active base 120 via the peripheral interface 150 and the local communication devices 140.

In some embodiments, the input/output interface 116 provides a channel for input/output data between the processor 112 and input/output peripheral devices, such as a display, a keyboard, a mouse, a pen, microphones, cameras, and/or speakers of the user equipment 110. In some embodiments, the peripheral devices are connected to the input/output interface 116 wirelessly, e.g., via the communication devices 114.

In some embodiments, the communication device 114 connects the user equipment 110 and an external electronic device wirelessly or through a wired connection. In some embodiments, the external electronic device is the active base 120, such that the communication device 114 connects to the active base 120 wirelessly or through a wired communication. The wireless communication includes at least one of, for example, Wi-Fi (e.g., IEEE 802.11a, IEEE 802.11b, IEEE 802.11g, IEEE 802.11n, and/or IEEE 802.11ac), Bluetooth (BT), Bluetooth Low Energy (BLE), Near Field Communication (NFC), Global Positioning System (GPS), and/or cellular communication, including but not limited to long term evolution (LTE), wideband code division multiple access (W-CDMA), code division multiple access (CDMA), time division multiple access (TDMA), or Global System for Mobile Communications (GSM). The wired connections include at least one of, for example, a Universal Serial Bus (USB) connector, a High Definition Multimedia Interface (HDMI) connector, and/or a Lightning® (a registered trademark of Apple Inc. of Cupertino, Calif.) connector.

In some embodiments, the user equipment 110 includes sensors 118, such as one or more accelerometers, gyroscopes, and/or magnetometers (e.g., as part of an inertial measurement unit (IMU)) for obtaining information concerning the position (e.g., altitude) of the user equipment 110, light sensors, or acoustic sensors. In some embodiments, the sensors 118 are coupled to the input/output interface 116, such that the information collected by the sensors 118 are passed to the processor 112 by the input/output interface 116 for further processing. For example, the input device camera uses light sensors for light sensing. In some embodiments, the sensors 118 are coupled to the communication device 114, such that the information collected by the sensors 118 is transmitted to another device (e.g., the active base 120) for validation. In some embodiments, the sensor 118 is coupled to the power supply 124 (e.g., a battery) of the user equipment 110 for obtaining the power level of the user equipment 110.

Figure 4A:
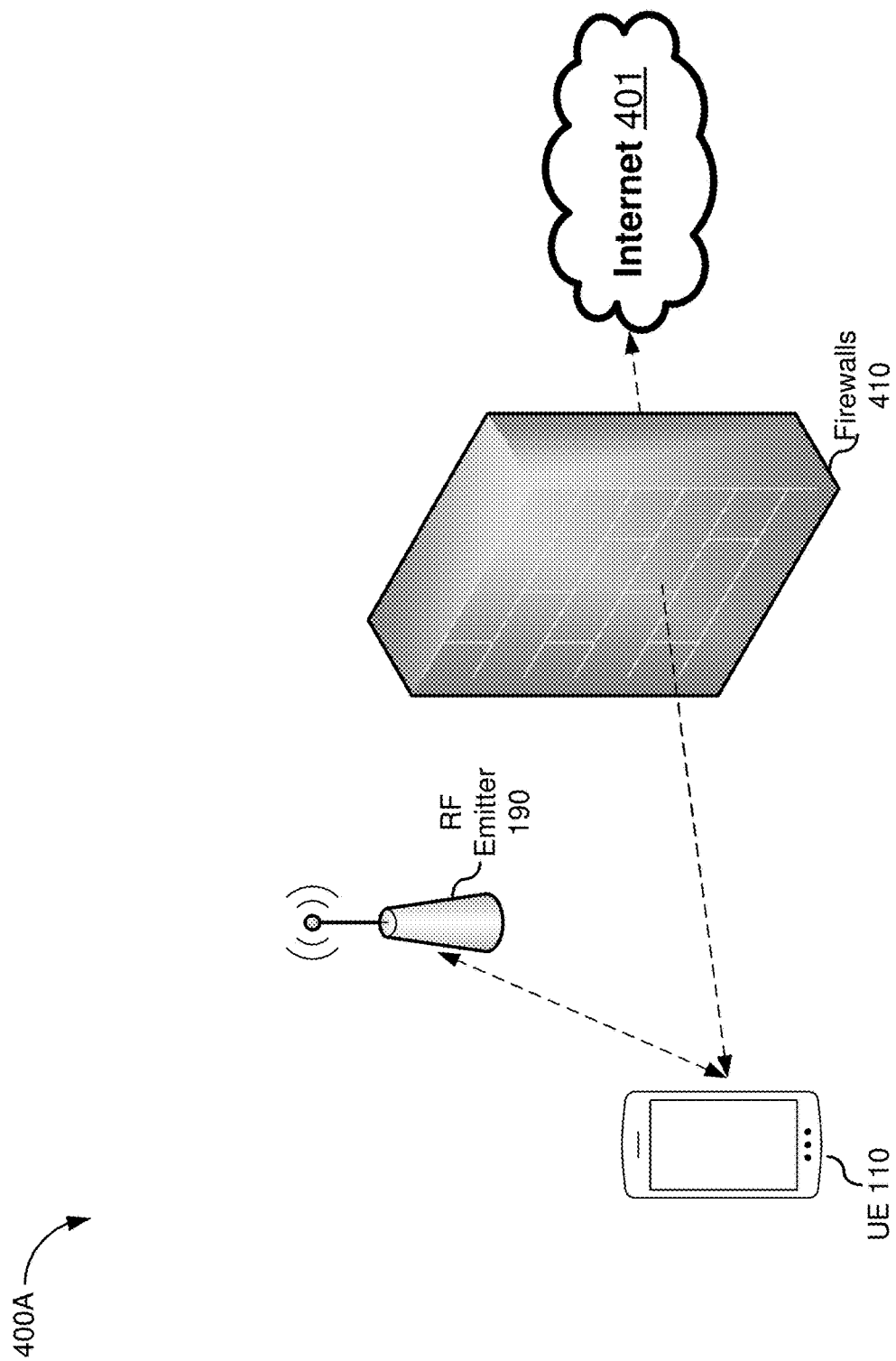
FIG. 4A illustrates a network with an unprotected user equipment in accordance with some embodiments.

FIG. 4A illustrates a network 400A including the unprotected user equipment 110 connecting to the RF emitter 190 behind firewalls 410, in accordance with some embodiments. As explained above, corporations often implement the firewalls 410 for network security. A firewall typically monitors and controls incoming and outgoing network traffic based on predetermined security rules. Thus, a firewall establishes a barrier between a trusted internal network and untrusted external network, such as the Internet 401. However, the firewalls 410 work at a traffic transfer point between the internal network (e.g., LAN) and the Internet 401. Thus, the firewalls 410 may not easily detect an internal rogue access point (AP), the RF emitter 190 that is located inside the firewalls 410 as shown in FIG. 4A. As such, the firewalls 410 are inadequate for protecting the user equipment 110 from being spied on by the RF emitter 190.

Figure 4B:
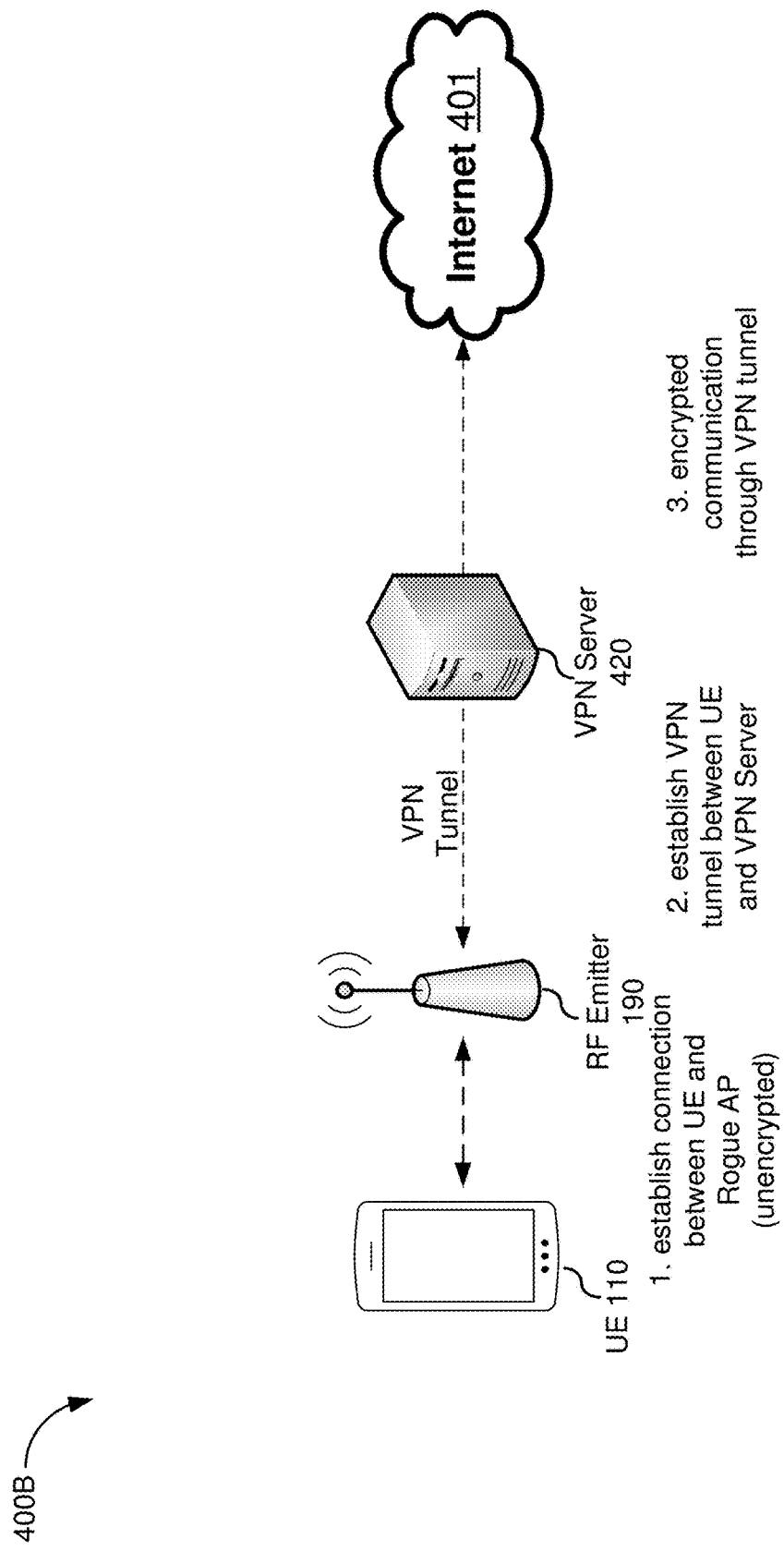
FIG. 4B illustrates another network with an unprotected user equipment in accordance with some embodiments.

FIG. 4B illustrates a network 400B including a VPN tunnel and the unprotected user equipment 110, in accordance with some embodiments. With the proliferation of public wireless networks in hotels, airports, bars, and countless other public places, more and more user equipment 110 (e.g., smart devices, laptops, tablets, wearables, etc.) use the public wireless networks for network connectivity. In a scenario with a fake Wireless AP, a man-in-the-middle attack is not difficult to implement to capture private information, e.g., password, email, voice calls, etc.

Many people use a virtual private network (VPN) for protection. As shown in the exemplary network 400B, a connection is established with a VPN server 420. Once the connection is connected, an encrypted VPN tunnel is provided for the Internet traffic. The VPN server then proxies the network traffic. The encrypted traffic makes the extraction of private information more difficult, e.g., extracting the addresses and URLs of the sites with which the user equipment 110 is communicating.

However, as shown in FIG. 4B, in order to establish the VPN tunnel, the user equipment 110 connects to the RF emitter 190 first. During the unencrypted connection establishment, in many public WiFi sites, the user equipment 110 often displays a "portal" in a browser. The user often manually accepts terms of service agreement to establish the connection with the RF emitter 190. During the second stage, the VPN tunnel is established between the user equipment 110 and the VPN server 420, and then the encrypted communication is exchanged through the VPN tunnel.

As shown in FIG. 4B, prior to the establishment of the VPN tunnel, the communication between the user equipment 110 and the RF emitter 190 is unencrypted. As such, the network traffic is out in the clear for intruders to see, e.g., potentially login credentials, details about the user equipment 110 configurations, etc. in clear text. Further, without any filtering, the RF emitter 190 can plant malicious codes to the user equipment 110, e.g., opening a backdoor communication channel with the user equipment 110. Consequently, the VPN tunnel established afterwards may be inadequate for the protection of the user equipment 110, e.g., the RF emitter 190 discretely obtains information from the user equipment 110 through the backdoor.

Figure 4C:
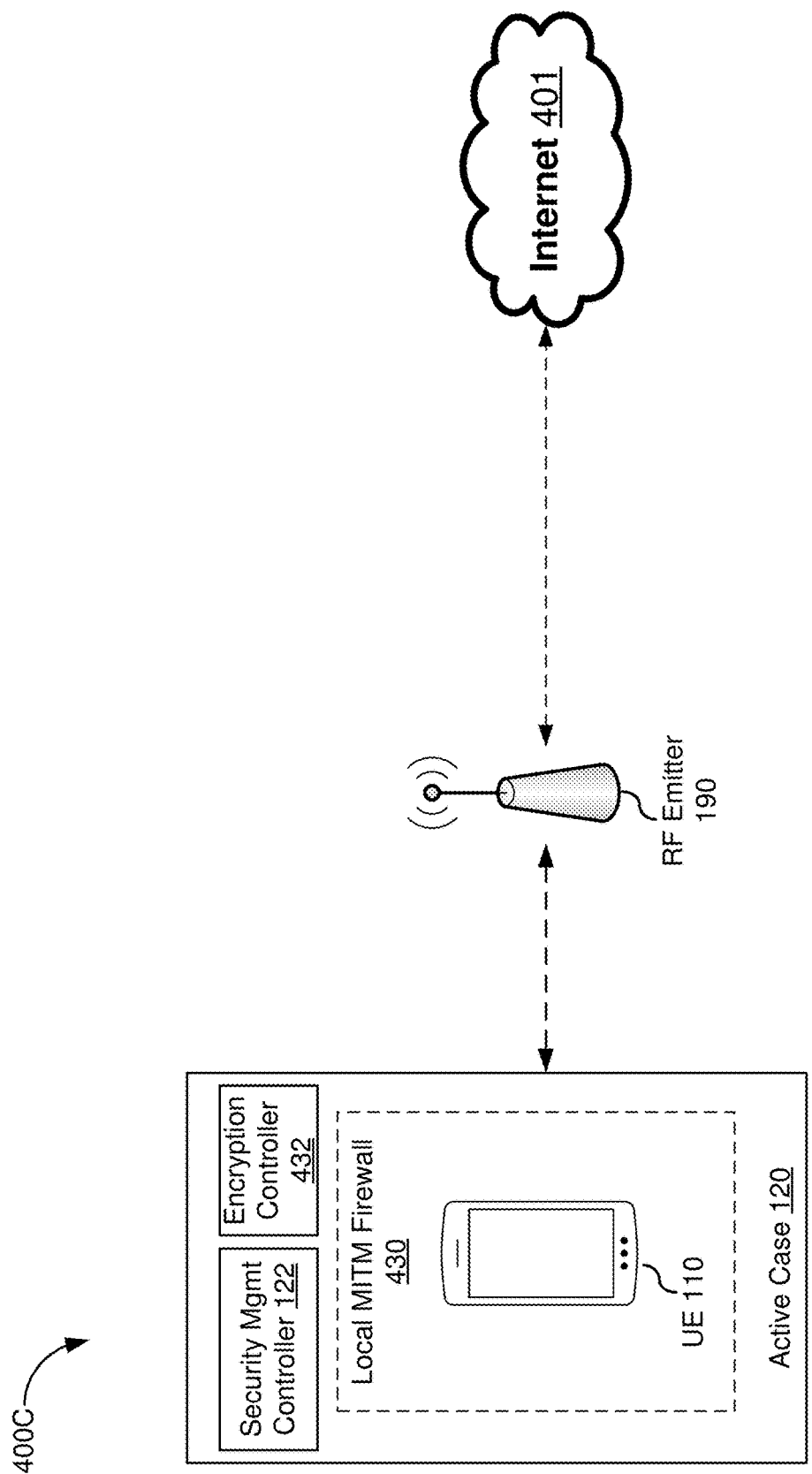
FIG. 4C illustrates a network with a user equipment protected by a local man-in-the-middle firewall in accordance with some embodiments.

FIG. 4C illustrates a network 400C including the user equipment 110 protected by a local man-in-the-middle firewall 430, in accordance with some embodiments. In some embodiments, the local man-in-the-middle firewall 430 is provided by the active case 120 and/or the backpack 160. As explained above with reference to FIG. 2, in some embodiments, the active case 120 includes the security management controller 122 that is operable to extract data from communication messages received from the RF emitter 190. Further, in some embodiments, the security management controller 122 scans the extracted data to separate potentially malicious content from non-malicious content. For example, based on signature or rule-based intrusion detection techniques, the active case 120 identifies malicious content that attempts to exploit the vulnerability of the user equipment 110, e.g., identifying spyware, malware, cookie adware bots etc. Additionally, in some embodiments, the security management controller 122 transmits non-malicious content to the personal communication device 110, so that the personal communication device 110 potentially leverages the connectivity offer by the RF emitter 190 to connect to the Internet 401.

In some embodiments, to further enhance the security, the security management controller 122 is operable to negotiate the communication channel with the RF emitter 190 independent of the personal communication device 110 and the local communication channel connecting the active case 120 to the personal communication device 110. As such, in case the rogue station 190 transmits tracking or other malicious codes through the communication channel, the active case 120 can analyze (e.g., sandbox) and/or quarantine the malicious codes and prevent the malicious codes from being passed to the user equipment 110.

In some embodiments, the active case 120 further includes an encryption controller 432 operable to encrypt data received from the personal communication device 110 through the local communication channel, and provide the encrypted data to the RF emitter 190 as payload data for outgoing transmissions to the RF emitter 190. As such, the link communication is secure, and the RF emitter 190 would not be able to extract private information from the communication. In some embodiments, the encryption is performed by the backpack 160, as will be shown and described below with reference to FIG. 5.

Figure 5:
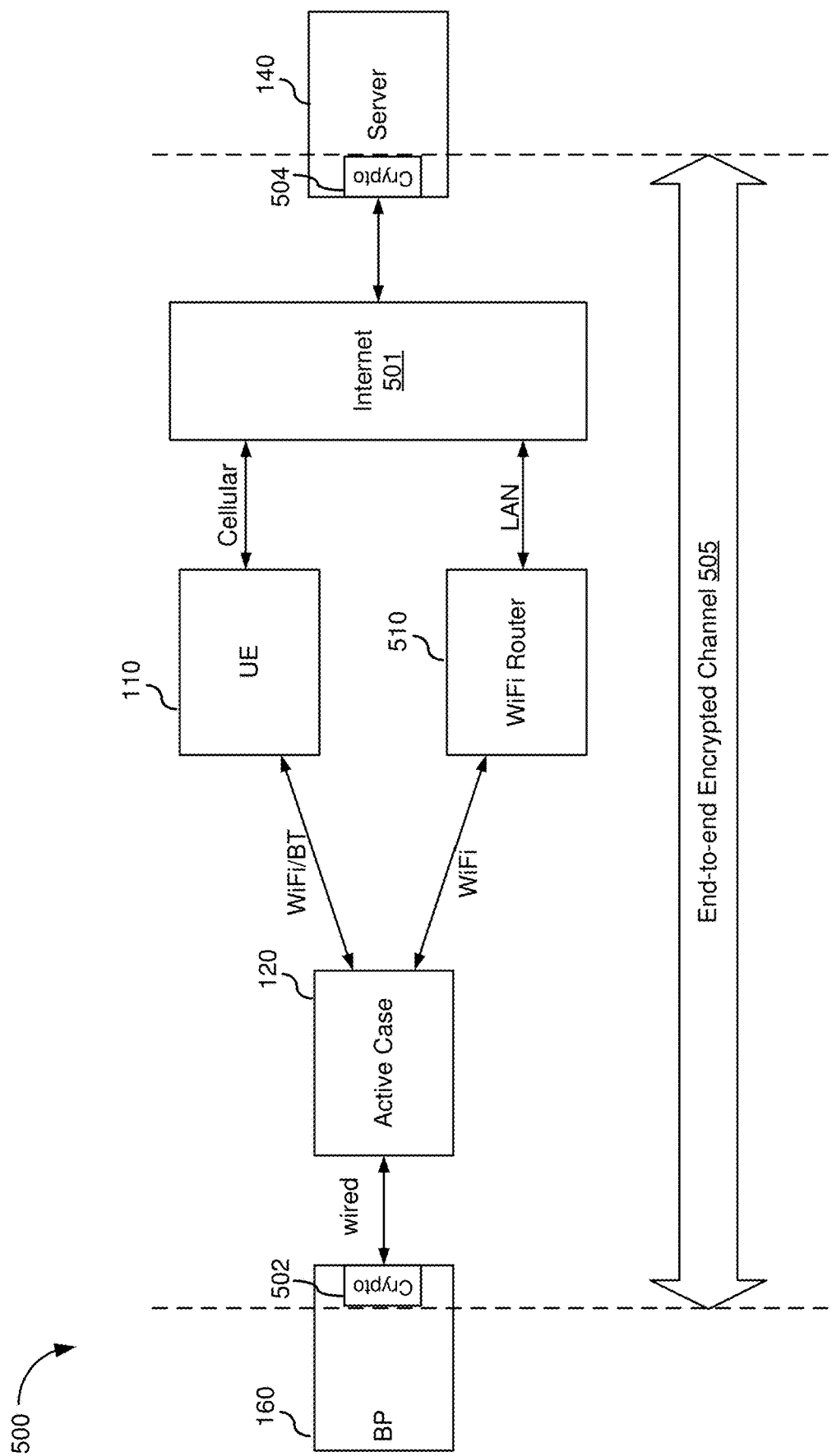
FIG. 5 is a block diagram of an exemplary secure and modular platform that provides an end-to-end encrypted channel in accordance with some embodiments.

FIG. 5 illustrates an exemplary secure and modular platform 500 in accordance with some embodiments. In some embodiments, the platform 500 includes the active case 120, the backpack 160, the personal communication device 110 held by the active case 120 and runs one or more applications, and a server 140 that comprises an online repository, analytics/processing, and/or client portal, etc. In some embodiments, an end-to-end encrypted channel 505 is established between the backpack 160 and the server 140 through the active case 120 and/or the user equipment 110 for added security and privacy protection.

For example, the backpack 160 provides the supplemental functionality of RF energy detection. As such, the backpack 160 sniffs data in the air and performs local processing, such as data filtering, encryption (e.g., using a crypto module 502), and/or compression. The backpack 160 exchanges encrypted data with the case 120 through wired connection in some embodiments. The case 120 routes traffic between the backpack 160 and the secure server 140, including the traffic through the user equipment 110. In some embodiments, the secure server 140 includes a crypto module 504 for encryption and decryption.

In some embodiments, the active case 120 communicates with the user equipment 110 and/or a WiFi router 510 wirelessly. The wireless communication is encrypted, and the communication between the user equipment 110/the WiFi router and the server 140 through the Internet 501, regardless of being wireless or wired, is also encrypted. As such, the server 140, which controls and command based on information stored in its database and through dashboards, communicated with the backpack 120 through the end-to-end encrypted channel 505.

The high-security system architecture as shown in FIG. 5 addresses a hardware gap in conventional security systems, protects against exploitation of hardware-based vulnerabilities, and provides a hardware root of trust for the broader system. Due to smartphone designs, each layer of a mobile device stack, e.g., from a hardware layer at the bottom to a firmware layer above the hardware layer, then an operating system layer and an application layer on top of the firmware layer, is vulnerable. As explained above, conventional host-based firewalls focus on the software layer and above. Thus, conventional host-based firewalls are inadequate in protection, e.g., cannot detect attacks to the firmware and/or hardware, and consumes resources of the smartphones. In contrast, the active case 120 provides a hardware root of trust that starts from the hardware layer, e.g., using a specialized system and crypto architecture to create a root key using a hardware true random number generator and stores the root key in the secure storage of the active case, e.g., the memory 130 in FIG. 2. As such, the root key is not exposed and cannot be externally extracted. In some embodiments, the active case 120 and/or the backpack 160 can then generate a certificate signing request within the device. Accordingly, an appropriate X.509 certificate bundle can be produced, provisioned, and stored within the device to maintain stringent control of allowed processes for execution prior to deployment. In other words, the trusted and secure resources (e.g., the off-device resource 170, FIG. 2) are built on the platform.

Using such trusted and secure resources, the active case 120 can identify processes that are safe to execute (e.g., by comparing signatures with X.509 certificates) as well as malicious activities. As such, when an RF emitter (not shown) that is in proximity, the UES can independently communicate with the RF emitter with the RF emitter and identify processes that are safe to execute on the UES and/or the user equipment 110 as well as processes that are unsafe to execute. For instance, when a WiFi hotspot sends a bundle of programs to be executed in order to establish a network connection, the UES can separate safe programs in the bundle, e.g., programs for connection establishment, from unsafe programs in the bundle, e.g., malware or user private data collection programs, etc. Having identified the safe programs, in some embodiments, the UES can permit the safe programs to be executed on the UES and/or the user equipment 110. Having identified the unsafe programs, in some embodiments, the UES can quarantine or report the unsafe programs in order to protect the user equipment 110.

Figure 6:
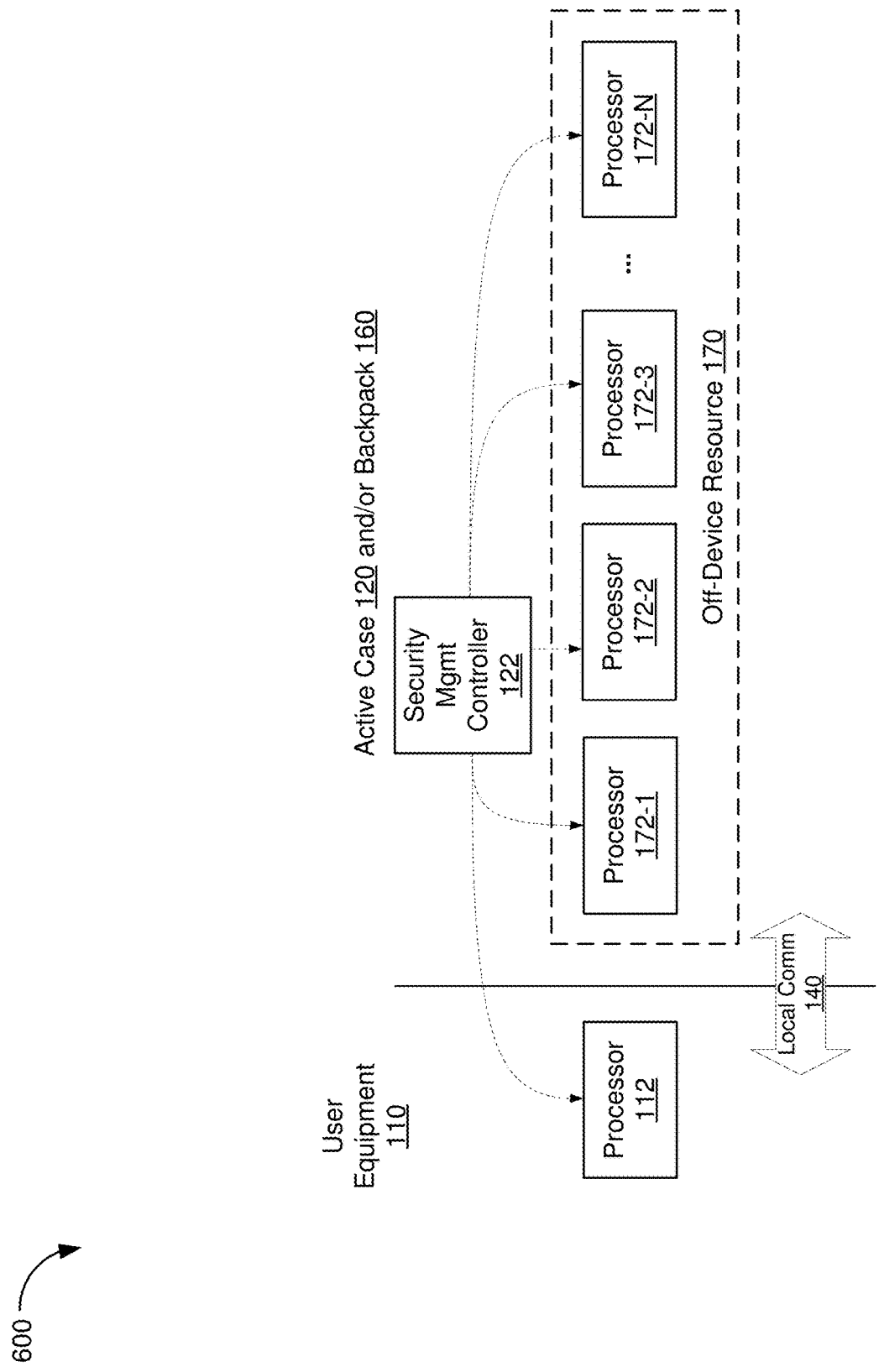
FIG. 6 illustrates an exemplary local off-device resource providing alternative processing capacity in accordance with some embodiments.

FIG. 6 illustrates an exemplary system 600 in which the at least one off-device resource 170 provides alternative processing capacity for the personal communication device 110 in accordance with some embodiments. As shown in FIG. 6, in some embodiments, the at least one off-device resource 170 includes one or more processors, e.g., the processors 172-1, 172-2, 172-3, ..., 172-N. In some embodiments, the controller 122 manages resource scheduling between the processors 172-1, 172-2, 172-3, ..., 172-N of the active case 120 and/or the backpack 160 and the corresponding on-device resource, e.g., the processor 112, of the personal communication device 110 through the communication channel provided by the local communication device 140.

In some embodiments, one or more of the processors 172-1, 172-2, 172-3, ..., 172-N can be enabled to add additional processing power for intrusion detection and privacy detection. In some other embodiments, one or more of the processors 172-1, 172-2, 172-3, ..., 172-N can be enabled to take over the processing function on behalf of the processor 112 for the personal communication device 110. In yet some other embodiments, at least a portion of the processors 172-1, 172-2, 172-3, ..., 172-N can be enabled for the protection of at least a portion of the on-device processor 112.

For example, the on-device processor 112 can include one or more protection domains, sections, time slices, or portions reserved for executing different types of applications and/or programs, e.g., different portions for executing OS, kernel, device drivers, user applications, etc. The portion of the off-device processors 172 can be used to supplement or replace the one or more portions of the on-device processor 112, such that the execution of the malicious codes by the off-device resource 170 can be confined to the active case 120 and/or the backpack 160. Further, as explained above with reference to FIG. 3, in some embodiments, utilizing techniques such as code signing provided by the trusted and secure off-device resource 170, the malicious codes may be identified, e.g., by comparing the X.509 certificate with the signature of the malicious codes. As such, the malicious codes would not be able to access private information on the personal communication device 110. In some embodiments, upon identifying the malicious codes, the controller 122 can direct the processors 172 to stop the execution of the malicious codes, thus preventing the malicious codes from gaining access to the I/O devices 116 of the personal communication device 110.

In some embodiments, the enablement of the off-device resource 170 is triggered by a mechanical switch (e.g., one or more moveable parts of the housing 125 or a mechanical switch at least partially supported by the housing 125), a soft switch (e.g., commands), and/or based on context without user intervention (e.g., activating a rule or policy in response to detecting intrusion or triggered by geo-fencing). Once enabled, the resource scheduling by the controller can be performed through technics such as multiprocessor, distributed computing, and the like.

Figure 7B:
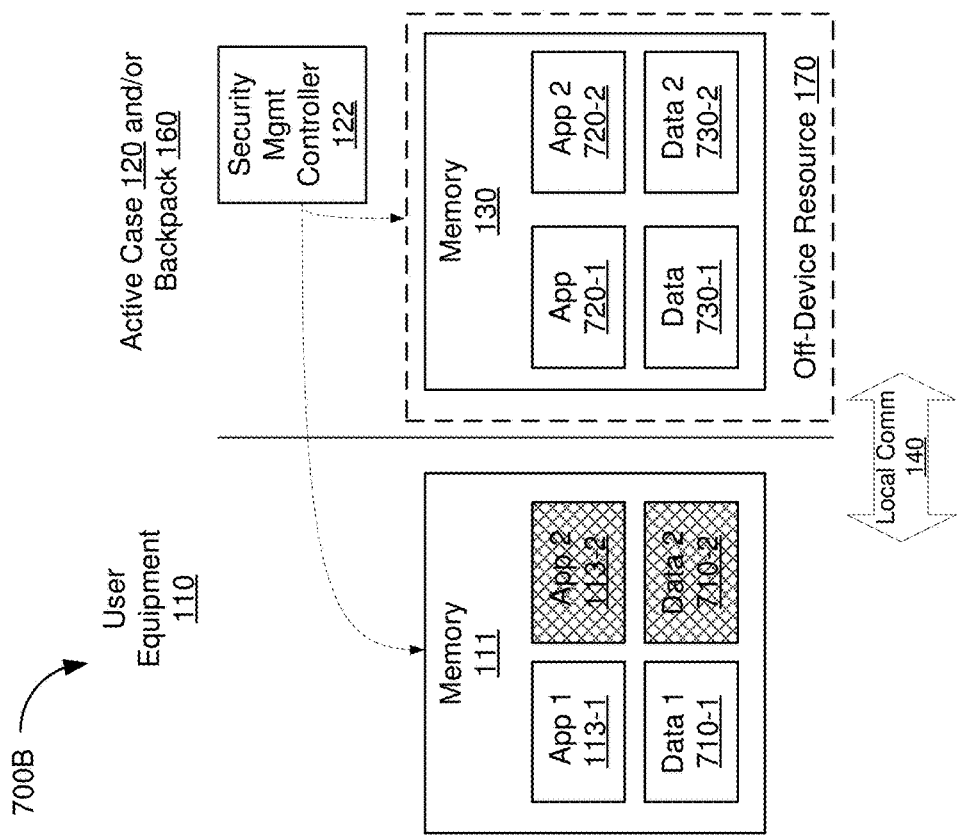
FIGS. 7A and 7B illustrate an exemplary local off-device resource providing alternative storage in accordance with some embodiments.
Figure 7A:
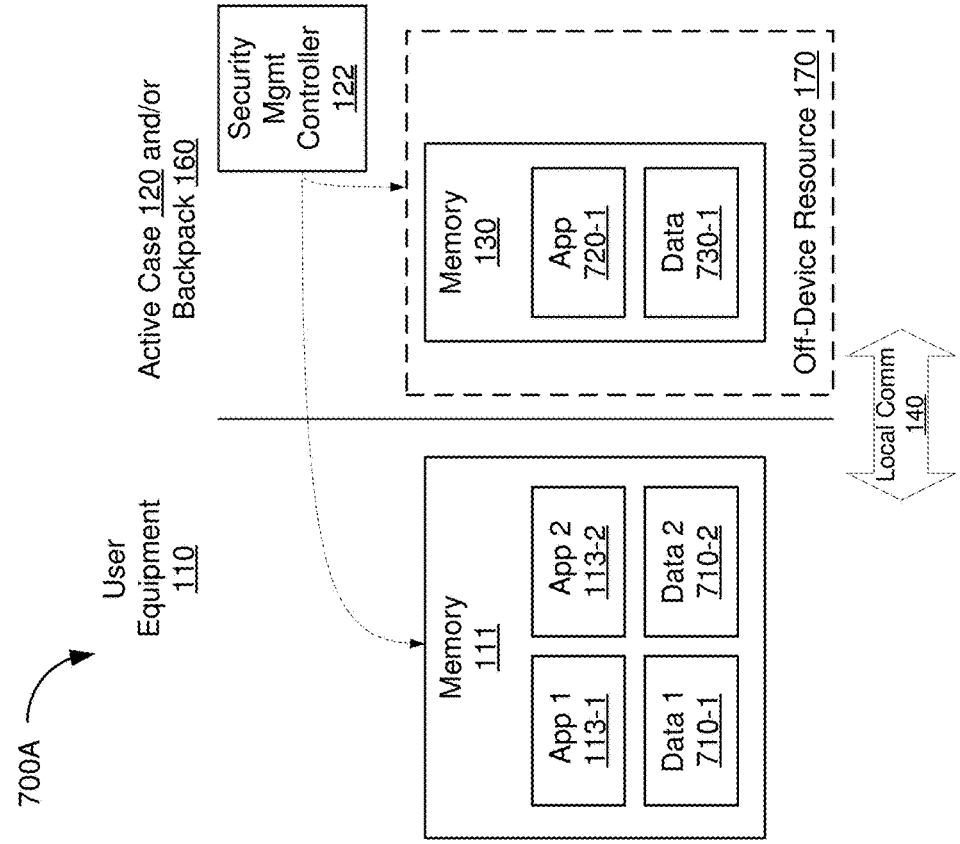

FIGS. 7A and 7B illustrate exemplary systems 700A and 700B in which the at least one off-device resource 170 provides alternative storage for the personal communication device 110 in accordance with some embodiments. In some embodiments, the at least one off-device resource 170 includes the non-transitory memory 130 operable to provide alternative storage for the personal communication device 110; and the corresponding on-device resource includes the non-transitory memory 111 of the personal communication device 110. In some embodiments, the controller 122 manages resource scheduling between the non-transitory memory 130 of the active case 120 and/or the backpack 160 and the corresponding on-device resource of the personal communication device 110, e.g., the non-transitory memory 111, through the communication channel provided by the local communication device 140.

In the exemplary system 700A shown in FIG. 7A, the on-device memory 111 includes on-device applications 113-1 and 113-2 and data repositories 710-1 and 710-2; and the non-transitory memory 130 as part of the at least one off-device resource 170 includes an off-device application 720-1 and a data repository 730-1. In some embodiments, the controller 122 manages resource scheduling between the on-device memory 111 and off-device memory 130 through the communication channel provided by the local communication device 140. The off-device application 720-1 and data storage 730-1 provide an alternate to the on-device applications 113 and data repositories 710, such that the execution of the off-device application 720-1 provides additional functions to the personal communication device 110, e.g., extra malicious codes detection, etc., and the extra information stored in the data storage 730-1 facilitates the intrusion detection and privacy protection of the personal communication device 110, e.g., virus signatures, geo-fence boundary information, whitelist and/or blacklist of RF emitters.

In some embodiments, as shown in FIG. 7B, the resource scheduling performed by the controller 122 includes migrating or disabling of the on-device application 113-2 and data repository 710-2 from the on-device memory 111 and executing or enabling a corresponding off-device application 720-2 and data storage 730-2 on the off-device memory 130 (e.g., sandbox). For example, in response to detecting a malicious off-device application 720-1 and its associated data repository 710-2 by the active case 120 and/or the backpack 160, the controller 122 instructs the removal and/or quarantine of the malicious codes and the associated data and performs its analysis by executing the off-device application 720-2 and using the data storage 730-2 for off-device analysis. As such, the personal communication device 110 is protected against intrusion and the extra analysis can be performed by the off-device resource without impacting the performance of the personal communication device 110.

FIGS. 8A and 8B illustrate exemplary systems 800A and 800B in which the at least one off-device resource 170 provides alternative data transport for the personal communication device 110 in accordance with some embodiments. In some embodiments, the at least one off-device resource 170 includes the communication device 174 (e.g., cellular, WiFi, LoRa, etc.) operable to provide alternative data transport for the personal communication device 110; and the corresponding on-device resource includes the communication device 114. In some embodiments, the controller 122 manages resource scheduling between the communication device 174 of the active case 120 and/or the backpack 160 and the corresponding on-device communication device 114 of the personal communication device 110 through the communication channel provided by the local communication device 140.

In the exemplary system shown in FIG. 8A, the on-device communication device 114 communicates with an RF emitter 810. In some embodiments, as shown in FIG. 3 and described above, the RF emitter 810 is in direct communication with the on-device communication device 114 of the personal communication device 110, with the controller 122 coordinating between the off-device communication device 174 of the active case 120 and/or the backpack 160 in order to provide a secure communication channel. As such, the off-device communication device 174 adds extra security to the wireless communication between the personal communication device 110 and the RF emitter 810.

In the exemplary system shown in FIG. 6B, the controller 122 directs the on-device communication device 114 to communicate indirectly with the RF emitter 810. For example, the off-device communication device 174 serves as man-in-the-middle to communicate with the RF emitter 810 on one end and pass filtered information to the on-device communication device 114 through the local communication device 140 on the other end. As such, the off-device resource 170 behaves like a firewall to filter out malicious information (e.g., cookies, trackers) while allowing connectivity for the personal communication device 110.

Figure 9:
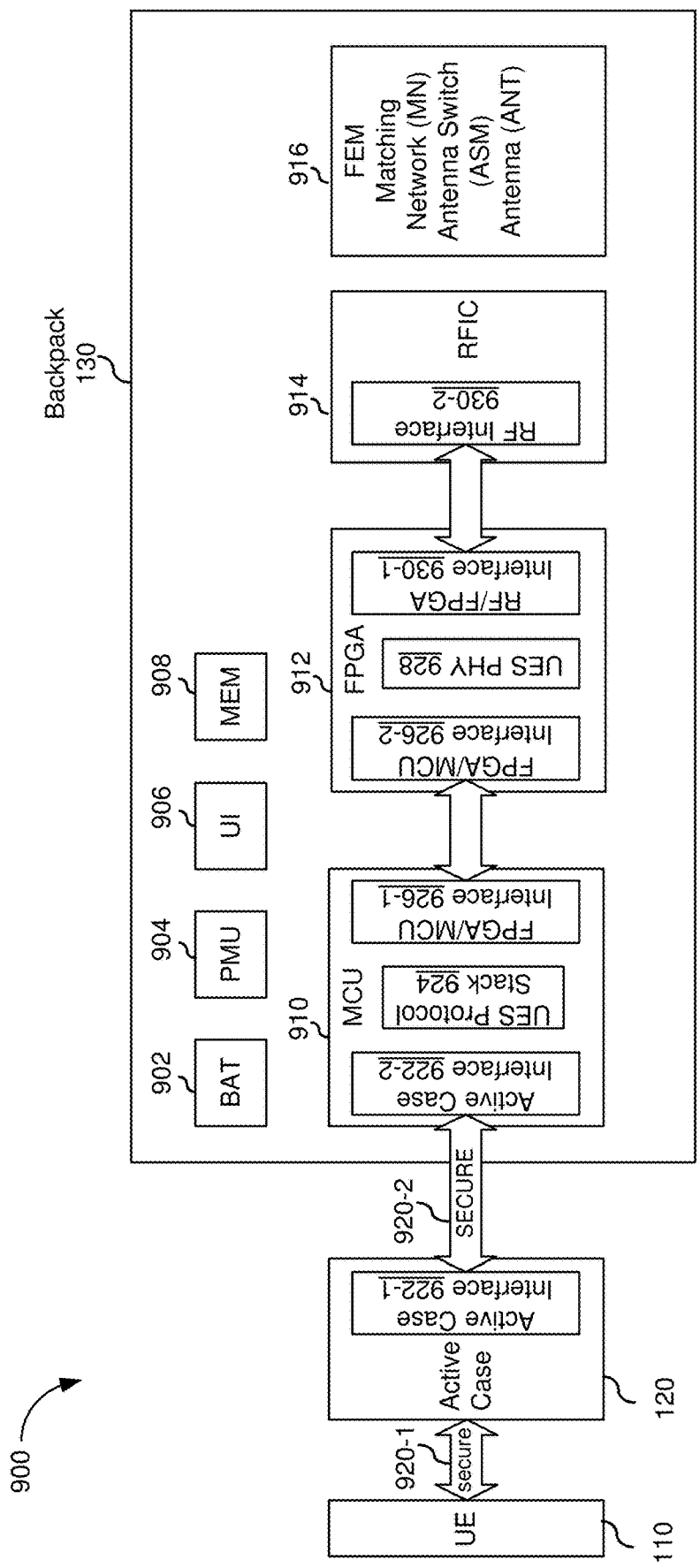
FIG. 9 illustrates an exemplary local off-device resource providing electronic isolation in accordance with some embodiments.

FIG. 9 illustrates an exemplary block diagram 900 of the at least one off-device resource including a security appliance operable to provide electronic isolation of data and/or communications for the personal communication device 110 in accordance with some embodiments. In some embodiments, the security appliance is a physical shield, e.g., as part of the housing 125 or as a separate mechanical part. In some embodiments, the security appliance is an electronic component, e.g., a Radio Frequency Integrated Circuit (RFIC) 914 as shown in FIG. 9.

In some embodiments, the backpack 160 includes a battery 902, a power management unit (PMU) 904, a user interface (UI) 906, a memory 908, a microcontroller (MCU) 910, a Field Programmable Gate Arrays (FPGA) 912, a Radio Frequency Integrated Circuit (RFIC) 914, and a frontend module (FEM) 916. It should be noted that at least some of the RF power detector functions can be integrated into the active case 120 in some embodiments. Thus, the RF power detector can be part of the active case 120, the backpack 160, or the combination of the active case 120 and the backpack 160. In other words, the UES can refer to the active case 120, the backpack 160, or the combination of the active case 120 and the backpack 160. For example, at least part of the functions performed by the MCU 710, the FPGA 912, the RFIC 914, and/or the FEM 916 can be performed by the controller 122, the one or more communication circuitries 140.

In some embodiments, the MCU 910 is connectable to the active case 120 through a secure channel 920, including the secure channel 920-2 established through an Object Linking & Embedding (OLE) interface as an active case interface on the active case 120 and the active case interface 922-2 on the MCU 910. In some embodiments, a peripheral interface (e.g., backpack bus or a wireless interface to a wireless capable backpack device) connects the MCU 910 to the active case 120, e.g., via physical connectors or wireless modem connectors).

In some embodiments, the active case 120 is operably connectable to the personal communication device 110 and the peripheral interface, which forms the secure communication channel 920, obtains uplink communication signals and downlink communicate signals of the personal communication device 110 through the active case 120. As such, the MCU 910 obtains information associated with the personal communication device 110 through the peripheral interface. In some embodiments, the MCU 910 is coupled to the FPGA 912 through an FPGA/MCU interface 926-1. The MCU 910 executes instructions implementing a protocol stack 924 for context-based data processing and decision making of RF detection. Further, the MCU 910 handles signaling and control, crypto communication, secure communication, and/or over-the-air (OTA) firmware update for the backpack 160. In some embodiments, the MCU 910 scans an RF spectrum of the communication signal that is received by the RF detection device (e.g., the RFIC 914) in order to identify communications associated with the personal communication device 110, the active case 120, and/or the backpack 160.

In some embodiments, the FPGA 912 is coupled to the MCU 910 through an FPGA/MCU interface 926-2 and is coupled to the RFIC 914 through an RF/FPGA interface 930-1. The FPGA 912 provides high speed data processing and digital filtering. In some embodiments, the FPGA 712 is operable to compare the energy detected by the RFIC 914 with a threshold in order to identify at least one energy burst and evaluate whether the at least one energy burst matches a signal protocol signature of the signal protocol.

In some embodiments, the RFIC 914 is coupled to the FPGA 912 through an RF interface 930-2. The RFIC 914 performs data conversion between RF and digital signals and is operable to detect energy carrying a communication signal to or from the personal communication device 110 and/or the active case 120. When in a receiving mode, the RFIC 914 allows the backpack 160 to perform its normal functions, e.g., RF signal detection, etc. When in a transmitting mode, the RFIC 914 provides RF isolation of the user equipment 110, the active case 120, and/or the backpack 160. In some embodiments, the backpack 160 includes a remote communication device, operable to transmit wirelessly to a remote secure server. In some embodiments, the remote communication function is performed at least in part by the RFIC 914.

In some embodiments, the FEM 916 can detect RF signals and/or perform electromagnetic simulation, e.g., simulating RF performance, obtaining or setting RF characteristics as a function of carrier frequency, etc. In some embodiments, the FEM 916 includes at least one of an antenna tuner (also known as a matching network (MN)), an antenna switch (ASM), and/or an antenna (ANT) for wireless communication and/or electromagnetic simulation.

As explained above with reference to FIG. 2, the active case 120 has a housing 125 that is arranged to received and hold the user equipment 110. Further, the backpack 160 can be attached to the active case 120. As such, at least parts of the UES (e.g., the active case 120 and/or the backpack 160) are in close distance to the user equipment 110, e.g., in the range of millimeters. Accordingly, different from conventional threat detection systems and methods that detect and monitor the user equipment 110 from a distance, the UES can detect potential threats faster and the threat detection is more accurate, e.g., detecting a surge of RF energy when a compromised user equipment 110 falsely reports its antenna status. Further, the UES (e.g., the active case 120 and/or the backpack 160) is capable of controlling sensor paths and/or communication paths associated with the user equipment 110, e.g., disabling the sensors and/or communication devices on the user equipment 110 and/or re-directing the information from the user equipment 110. As such, the UES can quickly react to the accurate threat detection, e.g., shutting down the user equipment 110, stop execution of malicious codes by the processors 172 (FIG. 6), stopping the communication of the user equipment 110 with a remote source (as shown in FIGS. 8A and 8B), shielding sensitive data from the user equipment 110 (as shown in FIGS. 7A and 7B), etc.

Figure 10:
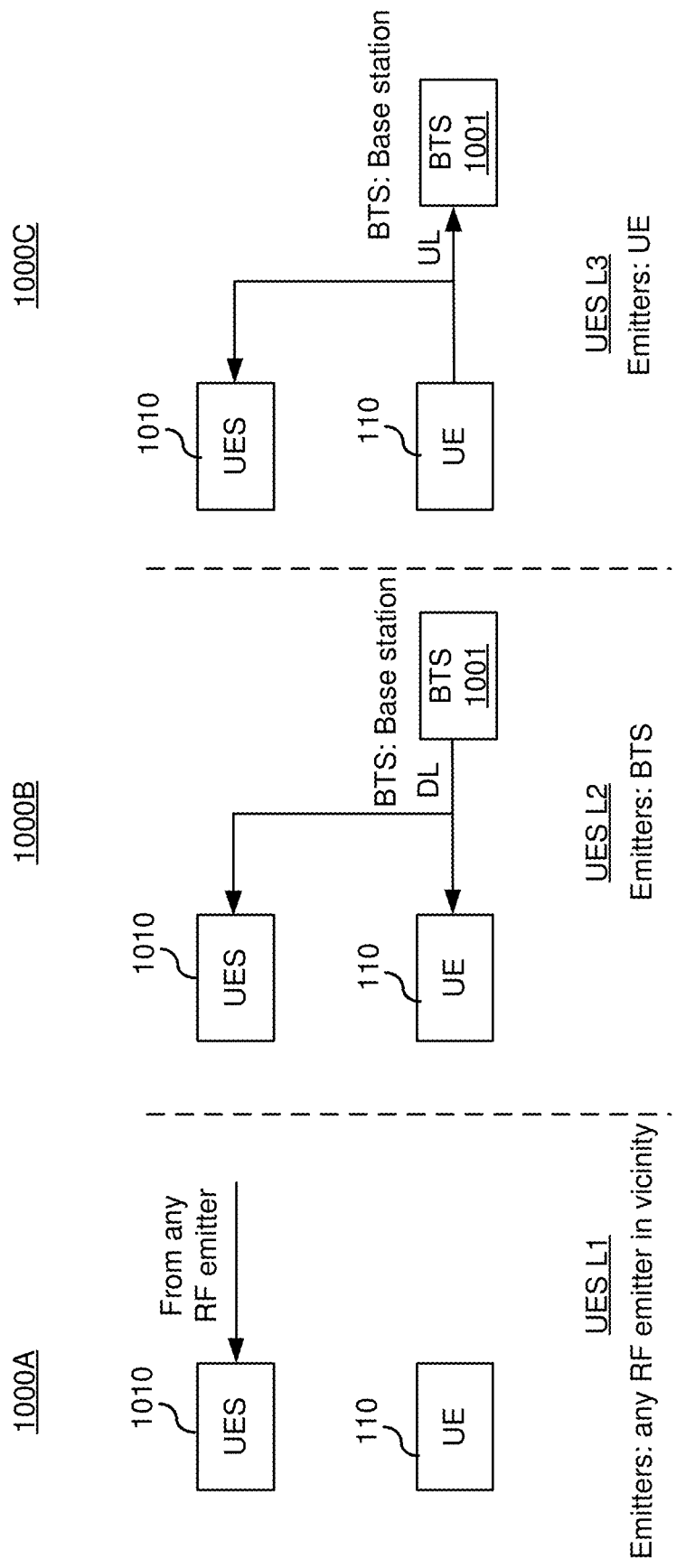
FIGS. 10A-10C illustrate various layers of RF signal characteristics extraction in accordance with some embodiments.

FIGS. 10A-10C illustrate various layers 1000A-1000C of RF signal characteristics extraction performed by a UES 1010 (e.g., the active case 120 and/or the backpack 160 in FIG. 1) in accordance with some embodiments. In some embodiments, as shown in FIG. 9, the MCU 910 and/or the FPGA 912 of the backpack 160 scans the RF spectrum detected by the RFIC 914 and identifies signal protocol based on the signal signature patterns. Further, by sniffing the RF signals, the UES 1010 can perform RF signal detection to derive characteristics of wireless communications associated with the detected RF signals.

In some embodiments, as shown in FIG. 10A, a first layer (e.g., UES L1) RF signal detection scans an RF spectrum and identifies signal protocols (e.g., cellular 2G/3G/4G, WiFi, etc.) and identifies any RF emitter in the vicinity, e.g., the user equipment 110, a base station, a WiFi hotspot, etc. During the RF signal sniffing, the UES 1010 can identify characteristics, such as the signal protocol (e.g., 2G/3G/4G), frequency, bandwidth, and/or Peak-To-Average Power Ratio (PAPR), etc.

In some embodiments, as shown in FIG. 10B, a second layer (e.g., UES L2) RF signal detection captures LTE downlink (DL) signals and extracts the cell tower parameters. As such, the UES L2 RF signal detection can detect emitters that are base stations 1001. In other words, when the base stations 1001 are in communication with the user equipment 110, the UES 1010 can derive characteristics of the base stations 1001 based on the detected RF signals.

In some embodiments, as shown in FIG. 10C, a third layer 1 (e.g., UES L3) RF signal detection decodes LTE uplink (UL) signals and performs analysis packet to extract TCP and IP headers for network traffic monitoring. As such, the UES L3 RF signal detection can detect emitters that are user equipment 110 and extract information from wireless communications between the user equipment 110 and the base station 1001.

Figure 11:
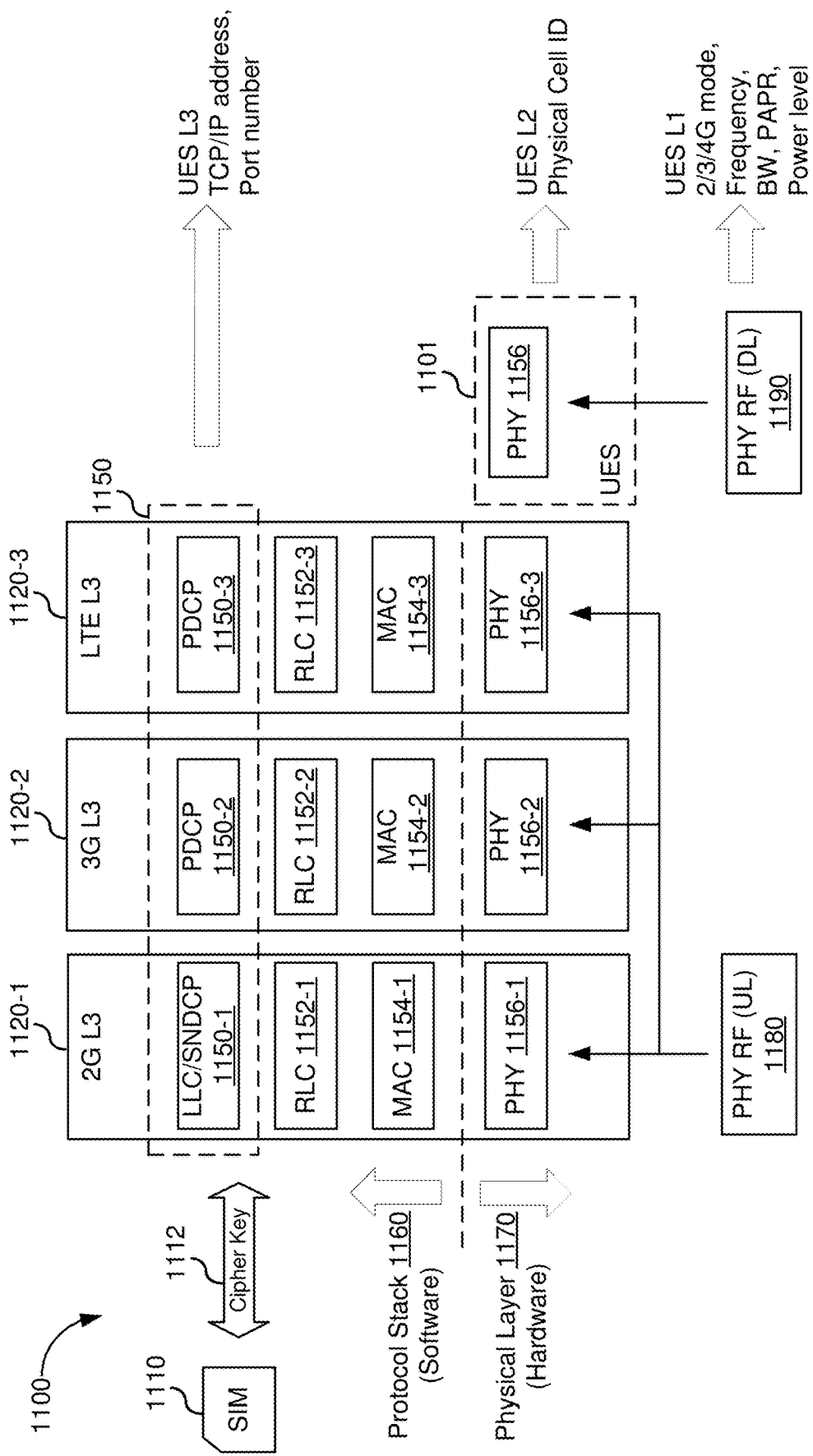
FIG. 11 illustrates an exemplary user equipment sniffer (UES) architecture for wireless communication characteristics extraction in accordance with some embodiments.

FIG. 11 illustrates an exemplary UES architecture 1100 for wireless communication characteristics extraction in accordance with some embodiments. As described above with reference to FIG. 10A, through physical RF signal sniffing, including sniffing uplink RF signals 1180 and/or downlink RF signals 1190, the UES 1101 can obtain RF characteristics of RF emitters in the vicinity, such as the signal protocol (e.g., 2G/3G/4G), frequency, bandwidth, and/or Peak-To-Average Power Ratio (PAPR), etc., in UES L1 RF signal detection. Further, through the downlink analysis 1190 of physical layer packets 1156 at the physical layer 1170, physical cell ID along with other cell tower parameters can be obtained in UES L2 RF signal detection.

In some embodiments, information of a SIM 1110 used by the user equipment 110 for wireless communication can be obtained by the active case 120. The retrieval of the SIM card information from the personal communication device 110 is disclosed in U.S. Pat. App. No. 62/588,887, titled "Apparatus with Dual Subscriber Identity Module (SIM) Interfaces," which is incorporated by reference in its entirety. The SIM information obtained by the active case 120 includes a cipher key 1112.

In some embodiments, using the cipher key 1112, TCP/IP and/or port number for different wireless communications can be obtained in UES L3 RF signal detection. For example, in FIG. 11, in various wireless communication protocols 1120 (e.g., 2G 1120-1, 3G 1120-2, or LTE 1120-3), the protocol stack 1160 above the physical layer 1170 includes an MAC layer 1154 for transport format and/or modulation, an RLC layer 1152 for concatenation, and a PDCP/LLC/SNDCP layer 1150 for compression. As is known in the art, Sub Network Dependent Convergence Protocol (SNDCP), is part of layer 3 of 2G protocol specification 1120-1. SNDCP interfaces to the Internet Protocol at the top, and to the 2G-specific Logical Link Control (LLC) protocol at the bottom. Various embodiments of SNDCP for 2G support IP as the payload type. Also as is known in the art, PDCP is an abbreviation for Packet Data Convergence Protocol. The PDCP is located in the Radio Protocol Stack on top of the layer 2 protocol, Radio Link Control (RLC) layer 1152, which is further on top of the Medium Access Control (MAC) layer 1154. PDCP provides its services to IP at the UE or to the relay at the base station. In some embodiments, the header compression technique can be based on either IP header compression (RFC 2507) or Robust Header Compression (RFC 3095). If PDCP is configured for No Compression it can send the IP Packets without compression; otherwise it will compress the packets according to its configuration by upper layer and attach a PDCP header and send the packet. Applying the cipher key to the PDCP/LLC/SNDCP layer 1150, the TCP/IP address and/or port number for the wireless communication can be extracted.

Figure 12:
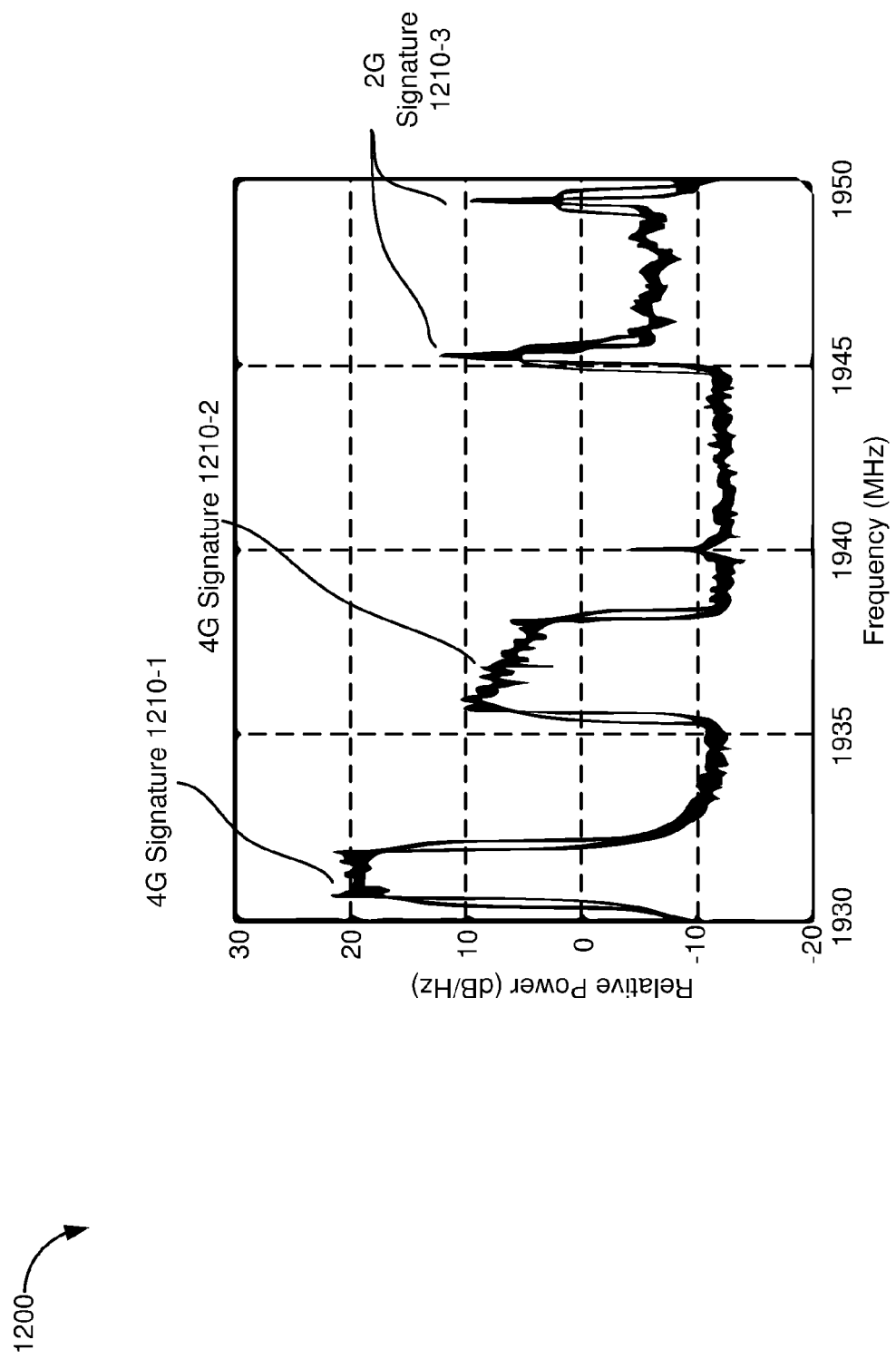
FIG. 12 illustrates exemplary first layer UES (UES L1) communication protocol identification in accordance with some embodiments.

FIG. 12 illustrates exemplary protocol signatures 1200 in UES L1 RF signal protocol identification process performed by the FPGA 912 (FIG. 9), in accordance with some embodiments. In some embodiments, the FPGA 912 is operable to compare the energy detected by the RFIC 914 with a threshold to identify at least one energy burst and evaluate whether the at least one energy burst matches a signal protocol signature of the signal protocol. For example, as shown in FIG. 12, an energy burst of the relative power of approximately 20 dB/Hz in the 1930-1935 MHz spectrum is a signature 1210-1 for 4G protocol; an energy burst of the relative power of approximately 10 dB/Hz in the 1935-1940 spectrum is a signature 1210-2 for 3G and/or 4G protocol; two energy bursts of the relative power of approximately 5 dB/Hz and less in the 1945-1950 spectrum is a signature 1210-3 for 2G protocol. As used herein, energy or power is a scalar (e.g., amplitude vs. time); whereas signal can be a scalar or a vector (e.g., amplitude/phase vs. time). In some embodiments, the protocol recognition described herein is achieved by extracting signal frequency band location, bandwidth, and peak-to-average power (PARP) ratio. Thus, energy detection can be performed by comparing signal amplitude, envelope, and/or waveform with the signatures in accordance with some embodiments disclosed herein.

FIG. 13 illustrates an exemplary multi-user distributed RF sensor network 1300 for RF emitter detection and mapping in accordance with some embodiments. In the multi-user environment 1300, in some embodiments, each UES 1301 (as indicated by a small circle in each big circle) sends receive signal strength indicator (RSSI) of each RF signature, time, and geolocation (e.g., from GPS) to a secure server 1320 in order to triangulate and identify 1320 stationary and/or moving emitter(s) 1310. In some embodiments, the secure server 1320 aggregates locations of RF emitters, generates a map including a whitelist of RF emitters (e.g., safe to communicate with) and a blacklist of RF emitters (e.g., malicious RF emitters and/or rogue base stations), and alerts the abnormal activities when the communication signal is associated with an RF emitter on the blacklist (e.g., when the UES 1301 holding the personal communication device is approaching an RF emitter in a high threat area 1370). In some embodiments, during the UES L1 RF signal protocol identification process RF signal protocol identification process, a synchronized distributed network is used to generate the map.

In order to generate the map, in some embodiments, the multi-user distributed network 1300 includes operating multiple UESs 1301 at the same frequency band of RF emitters to achieve RF emitter localization. In some embodiments, in order to detect moving RF emitters, e.g., drones or RF emitters on moving vehicles, frequency synchronized UESs can be used in conjunction with spatial deployment, e.g., directing a UES 1301 at a particular location to perform RF signal detection in order to obtain the triangulation of the moving RF emitter.

In some other embodiments, instead of synchronizing bandwidth, the synchronization in the distributed network 1300 is achieved by using the time stamp and/or server triggering signal. In some embodiments, calibration can be used to alignment synchronization. In some embodiments, alignment can be achieved by using GPS clock for timestamp, cell tower broadcast signal, UE transmission, and/or combination of above. In such embodiments, the secure server 1320 assigns broadband spectrum monitoring, e.g., by operating UES backpacks at different frequency bands. For example, the first UES 1301-1 is assigned to operate at 900-920 MHz band, and the second 1301-2 is assigned to operate at 920-940 MHz band, and so on. As such, the RF emitter 710 is not necessarily in communication with the personal communication device before being detected. For example, Phone A is operating in B and x, and the server 1320 issues a command to the respective UES 1301 of Phone B and Phone C in proximity to perform RF emitter detection of an RF emitter operating in Band y. In response to identifying that the RF emitter operating in Band y is malicious, the secure server 720 can direct the respective UES 1301 holding Phone A to protect the Phone A even before the malicious RF emitter communicates with Phone A.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

What is claimed is:

1. An apparatus comprising:
   a housing arranged to hold a personal communication device;
   a remote communication device, at least partially supported by the housing, operable to provide a remote communication channel to a remote device;
   a local communication device, at least partially supported by the housing, operable to provide a local communication channel to the personal communication device;
   a secure non-transitory memory in the housing for storing certificates of safe processes; and
   a security management controller in the housing coupled to the remote communication device, the secure non-transitory memory, and the local communication device via a bus, wherein the security management controller is operable to:
      extract data from communication messages obtained through the remote communication channel,
      scan the extracted data by obtaining a signature of the extracted data, locating the signature of the extracted data among the certificates of safe processes, and upon said locating, identifying the extracted data as a first type of extracted data,
      send the first type of extracted data to the personal communication device via the local communication channel, and
      allow execution of the first type of extracted data on the personal communication device.

2. The apparatus of claim 1, wherein the first type of extracted data includes safe content.

3. The apparatus of claim 1, further comprising an encryption controller, coupled to the security management controller via the bus inside the housing, operable to:
   encrypt the data received from the personal communication device through the local communication channel; and
   provide the encrypted data to the remote device through the remote communication channel.

4. The apparatus of claim 1, wherein the security management controller is further operable to scan the extracted data in order to identify a second type of extracted data that includes malicious content.

5. The apparatus of claim 4, wherein the security management controller is operable to isolate the second type of extracted data.

6. The apparatus of claim 1, wherein the security management controller is operable to disable, through the local communication channel, at least one communication device on the personal communication device.

7. The apparatus of claim 1, wherein the remote communication channel to the remote device is established independent of the personal communication device and the local communication channel.

8. The apparatus of claim 1, further comprising a radio frequency (RF) emitter detector, at least partially supported by the housing and connectable to the security management controller, operable to:
   obtain, via the local communication device, subscriber identity module (SIM) information associated with the communication messages from a SIM slot of the personal communication device;

obtain, via the remote communication device, downlink communication parameters and uplink communication parameters associated with the communication messages;
apply the SIM information, the downlink communication parameters, and the uplink communication parameters to obtain characteristics of the remote device; and
provide the characteristics of the remote device to the security management controller.

9. The apparatus of claim 1, wherein the remote communication device is part of a supplemental functional device, the supplemental functional device is attachable to the housing and includes a peripheral interface, and the security management controller obtains the communication messages from the supplemental functional device via the peripheral interface.

10. The apparatus of claim 1, wherein the certificates of safe processes are created based on a root key and stored in the secure non-transitory memory.

11. A method comprising:
at an apparatus including a housing arranged to hold a personal communication device, a remote communication device at least partially supported by the housing, a local communication device at least partially supported by the housing, a secure non-transitory memory in the housing for storing certificates of safe processes, and a security management controller in the housing coupled to the remote communication device, the secure non-transitory memory, and the local communication device via a bus:
receiving communication messages from a remote device via a remote communication channel between the remote communication device and the remote device;
extracting data from the communication messages obtained through the remote communication channel;
scanning the extracted data by obtaining a signature of the extracted data, locating the signature of the extracted data among the certificates of safe processes, and upon said locating, identifying the extracted data as a first type of extracted data;
sending the first type of extracted data to the personal communication device via a local communication channel provided by the local communication device, and
allowing execution of the first type of extracted data on the personal communication device.

12. The method of claim 11, wherein the first type of extracted data includes safe content.

13. The method of claim 11, further comprising:
encrypting the data received from the personal communication device through the local communication channel; and
providing the encrypted data to the remote device through the remote communication channel.

14. The method of claim 11, further comprising:
scanning the extracted data in order to identify a second type of extracted data that includes malicious content; and
isolating the second type of extracted data.

15. The method of claim 11, further comprising disabling, through the local communication channel, at least one communication device on the personal communication device.

16. The method of claim 11, wherein the remote communication channel with the remote device is established independent of the personal communication device and the local communication channel.

17. The method of claim 11, wherein extracting the data from the communication messages obtained through the remote communication channel includes:
obtaining, via the local communication device, subscriber identity module (SIM) information associated with the communication messages from a SIM slot of the personal communication device;
obtaining, via the remote communication device, downlink communication parameters and uplink communication parameters associated with the communication messages; and
applying the SIM information, the downlink communication parameters, and the uplink communication parameters to obtain characteristics of the remote device.

18. The method of claim 11, further comprising:
identifying the extracted data as a second type of extracted data upon not locating the signature of the extracted data among the certificates of safe processes stored in the secure non-transitory memory of the apparatus; and
forgoing sending the second type of extracted data to the personal communication device.

19. The method of claim 11, wherein the remote communication device is part of a supplemental functional device, the supplemental functional device is attachable to the housing and includes a peripheral interface, and receiving the communication messages includes obtaining the communication messages from the supplemental functional device via the peripheral interface.

20. The method of claim 11, further comprising creating the certificates of safe processes based on a root key stored in the secure non-transitory memory.

* * * * *